US012784523B2

(12) United States Patent
Matsushita

(10) Patent No.: US 12,784,523 B2
(45) Date of Patent: Nov. 3, 2026

(54) INFORMATION PROCESSING SYSTEM, INFORMATION PROCESSING METHOD, AND NON-TRANSITORY COMPUTER-READABLE STORAGE MEDIUM FOR MULTI- STAGE ACCESS CONTROL

(71) Applicant: CANON KABUSHIKI KAISHA, Tokyo (JP)

(72) Inventor: Masahiro Matsushita, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 291 days.

(21) Appl. No.: 18/398,250

(22) Filed: Dec. 28, 2023

(65) Prior Publication Data

US 2024/0249579 A1 Jul. 25, 2024

(30) Foreign Application Priority Data

Jan. 24, 2023 (JP) ................................ 2023-008949

(51) Int. Cl.

| | |
|---|---|
| ***G07C 9/37*** | (2020.01) |
| ***G06V 10/74*** | (2022.01) |
| ***G06V 10/75*** | (2022.01) |
| ***G06V 10/764*** | (2022.01) |
| ***G06V 20/52*** | (2022.01) |
| ***G06V 40/10*** | (2022.01) |

(Continued)

(52) U.S. Cl.

CPC ............. *G07C 9/37* (2020.01); *G06V 10/751* (2022.01); *G06V 10/761* (2022.01); *G06V 10/764* (2022.01); *G06V 20/52* (2022.01); *G06V 40/10* (2022.01); *G06V 40/172* (2022.01); *G06V 40/50* (2022.01)

(58) Field of Classification Search

CPC .... G06V 10/75; G06V 10/751; G06V 10/761; G06V 10/764; G06V 20/52; G06V 40/10; G06V 40/172; G06V 40/50; G07C 9/38; G07C 9/20; G07C 9/22; G07C 9/37

See application file for complete search history.

(56) References Cited

U.S. PATENT DOCUMENTS 9,582,518 B2 2/2017 Matsushita
9,916,521 B2 3/2018 Matsushita
(Continued)

FOREIGN PATENT DOCUMENTS

| | | | |
|---|---|---|---|
| EP | 3996057 A1 * | 5/2022 | ............ G06V 40/40 |
| JP | 2006309490 A * | 11/2006 | |
| WO | 2018/110012 A1 | 6/2018 | |

*Primary Examiner* — Sumati Lefkowitz
*Assistant Examiner* — Ryan P Potts
(74) *Attorney, Agent, or Firm* — Carter, DeLuca & Farrell LLP

(57) ABSTRACT

An information processing system. First comparing unit compares a feature of a person detected in a first image and a feature of a person registered as a person permitted to pass through a first place. First controlling unit performs control to permit passage through the first place based on first similarity. Second comparing unit compares a feature of a person detected in a second image and a feature of a person registered as a person permitted to pass through a second place reached after passing through the first place. Second controlling unit performs control to not permit the person to pass through the second place based on a second similarity.

19 Claims, 22 Drawing Sheets

(51) Int. Cl.
*G06V 40/16* (2022.01)
*G06V 40/50* (2022.01)

(56) References Cited

U.S. PATENT DOCUMENTS

| | | | | |
|---|---|---|---|---|
| 10,055,822 | B2 | 8/2018 | Matsushita | |
| 10,147,018 | B2 | 12/2018 | Matsushita | |
| 10,217,010 | B2 | 2/2019 | Matsushita | |
| 10,353,954 | B2 | 7/2019 | Matsushita | |
| 10,664,523 | B2 | 5/2020 | Matsushita | |
| 10,762,133 | B2 | 9/2020 | Matsushita | |
| 2002/0191817 | A1* | 12/2002 | Sato | G06V 40/172<br>382/118 |
| 2006/0271525 | A1* | 11/2006 | Sukegawa | G06V 40/172 |
| 2007/0242860 | A1* | 10/2007 | Hasebe | G06V 40/166<br>382/118 |
| 2011/0103694 | A1* | 5/2011 | Nakano | G06V 40/172<br>382/190 |
| 2011/0311112 | A1* | 12/2011 | Matsuyama | G06V 40/171<br>382/118 |
| 2021/0165818 | A1 | 6/2021 | Matsushita | |
| 2022/0207915 | A1* | 6/2022 | Voss | G07C 9/257 |
| 2022/0245979 | A1* | 8/2022 | Tamura | G06V 40/172 |
| 2022/0319228 | A1* | 10/2022 | Kochi | G06T 7/0014 |

* cited by examiner

FIG. 4A

| PERSON ID | AUTHORIZATION STATE | ENTRY STATE | FIRST GATE AUTHORITY | SECOND GATE AUTHORITY | FACIAL FEATURE |
|---|---|---|---|---|---|
| 1 | UNAUTHORIZED | HAS NOT ENTERED | ABSENT | ABSENT | XXXXXXXX |
| 2 | AUTHORIZED WITH DEFERRAL | FIRST GATE | PRESENT | PRESENT | XXXXXXXX |
| 3 | AUTHORIZED | FIRST GATE | PRESENT | ABSENT | XXXXXXXX |
| 4 | AUTHORIZED | SECOND GATE | PRESENT | PRESENT | XXXXXXXX |

FIG. 4B

| PERSON ID | AUTHORIZATION STATE | ENTRY STATE | FIRST GATE AUTHORITY | SECOND GATE AUTHORITY | FACIAL FEATURE | TEMPORARY PERMITTED THRESHOLD | TEMPORARY FACIAL FEATURE |
|---|---|---|---|---|---|---|---|
| 1 | UNAUTHORIZED | HAS NOT ENTERED | ABSENT | ABSENT | xxxxxxxx | — | — |
| 2 | AUTHORIZED WITH DEFERRAL | FIRST GATE | PRESENT | PRESENT | xxxxxxxx | — | — |
| 3 | AUTHORIZED | FIRST GATE | PRESENT | ABSENT | xxxxxxxx | — | yyyyyyyy |
| 4 | AUTHORIZED | SECOND GATE | PRESENT | PRESENT | xxxxxxxx | 600 | yyyyyyyy |
| | | | | | | | |

INFORMATION PROCESSING SYSTEM, INFORMATION PROCESSING METHOD, AND NON-TRANSITORY COMPUTER-READABLE STORAGE MEDIUM FOR MULTI- STAGE ACCESS CONTROL

BACKGROUND OF THE INVENTION

Field of the Invention

The present invention relates to an information processing system, an information processing method, and a non-transitory computer-readable storage medium.

Description of the Related Art

A known entry and exit management system for managing entry and exit authorizes users using captured images. In a company and the like, an entry and exit management system installed with multi-stage authorization gates may be used where an authorization gate for entering a building is installed after an authorization gate for entering the premises.

International Publication No. 2018/110012 discloses a technique for reducing processing load is described that enables only people who have entered premises who have had their identification information obtained at an entry gate to be the target of a face image search using facial authentication when entering a restricted area. Also, Japanese Patent Laid-Open No. 2006-309490 discloses a technique for stopping queues being made for an authorization process that permits passage at a predetermined gate regardless of the result of a biometric authentication but performs a more rigorous determination on people who failed the previous authorization than on people who passed the previous authorization when a further authorization is required after passing through the gate.

However, with the technique disclosed in International Publication No. 2018/110012, when authorization at an entry gate where the first stage of authorization is performed fails, the next people are stopped and congestion occurs. For a company and the like, a congestion at a first authorization gate to enter the premises before the start of work can adversely affect the start of work for many people.

Also, with the technique disclosed in Japanese Patent Laid-Open No, 2006-309490, because entry is not restricted when authorization fails at the first stage of authorization, there is a possibility that a normally non-authorized person may be permitted to enter. Thus, there is a security risk.

SUMMARY OF THE INVENTION

According to one embodiment of the present disclosure, an information processing system comprises: at least one memory storing instructions; and at least one processor that, upon execution of the instructions, is configured to operate as: first comparing unit configured to compare a feature of a person detected in a first image and a feature of a person registered as a person permitted to pass through a first place, first controlling unit configured to perform control to permit passage through the first place in a case where a first similarity between the feature of the person detected in the first image and the feature of the person registered as the person permitted to pass through the first place is equal to or greater than a first threshold, second comparing unit configured to compare a feature of a person detected in a second image and a feature of a person registered as a person permitted to pass through a second place reached after passing through the first place, and second controlling unit configured to perform control to not permit the person to pass through the second place in a case where a second similarity between the feature of the person detected in the second image and the feature of the person registered as the person permitted to pass through the second place is less than a second threshold greater than the first threshold.

According to another embodiment of the present disclosure, an information processing method comprises: comparing a feature of a person detected in a first image and a feature of a person registered as a person permitted to pass through a first place; performing control to permit passage through the first place in a case where a first similarity between the feature of the person detected in the first image and the feature of the person registered as the person permitted to pass through the first place is equal to or greater than a first threshold; comparing a feature of a person detected in a second image and a feature of a person registered as a person permitted to pass through a second place reached after passing through the first place; and performing control to not permit the person to pass through the second place in a case where a second similarity between the feature of the person detected in the second image and the feature of the person registered as the person permitted to pass through the second place is less than a second threshold greater than the first threshold.

According to yet another embodiment of the present disclosure, a non-transitory computer-readable storage medium stores a program for causing a computer to: compare a feature of a person detected in a first image and a feature of a person registered as a person permitted to pass through a first place; perform control to permit passage through the first place in a case where a first similarity between the feature of the person detected in the first image and the feature of the person registered as the person permitted to pass through the first place is equal to or greater than a first threshold; compare a feature of a person detected in a second image and a feature of a person registered as a person permitted to pass through a second place reached after passing through the first place; and perform control to not permit the person to pass through the second place in a case where a second similarity between the feature of the person detected in the second image and the feature of the person registered as the person permitted to pass through the second place is less than a second threshold greater than the first threshold.

Further features of the present invention will become apparent from the following description of exemplary embodiments (with reference to the attached drawings).

BRIEF DESCRIPTION OF THE DRAWINGS

FIGS. 4A and 4B are diagrams illustrated examples of a database for holding authorization data.

DESCRIPTION OF THE EMBODIMENTS

Figure 1:
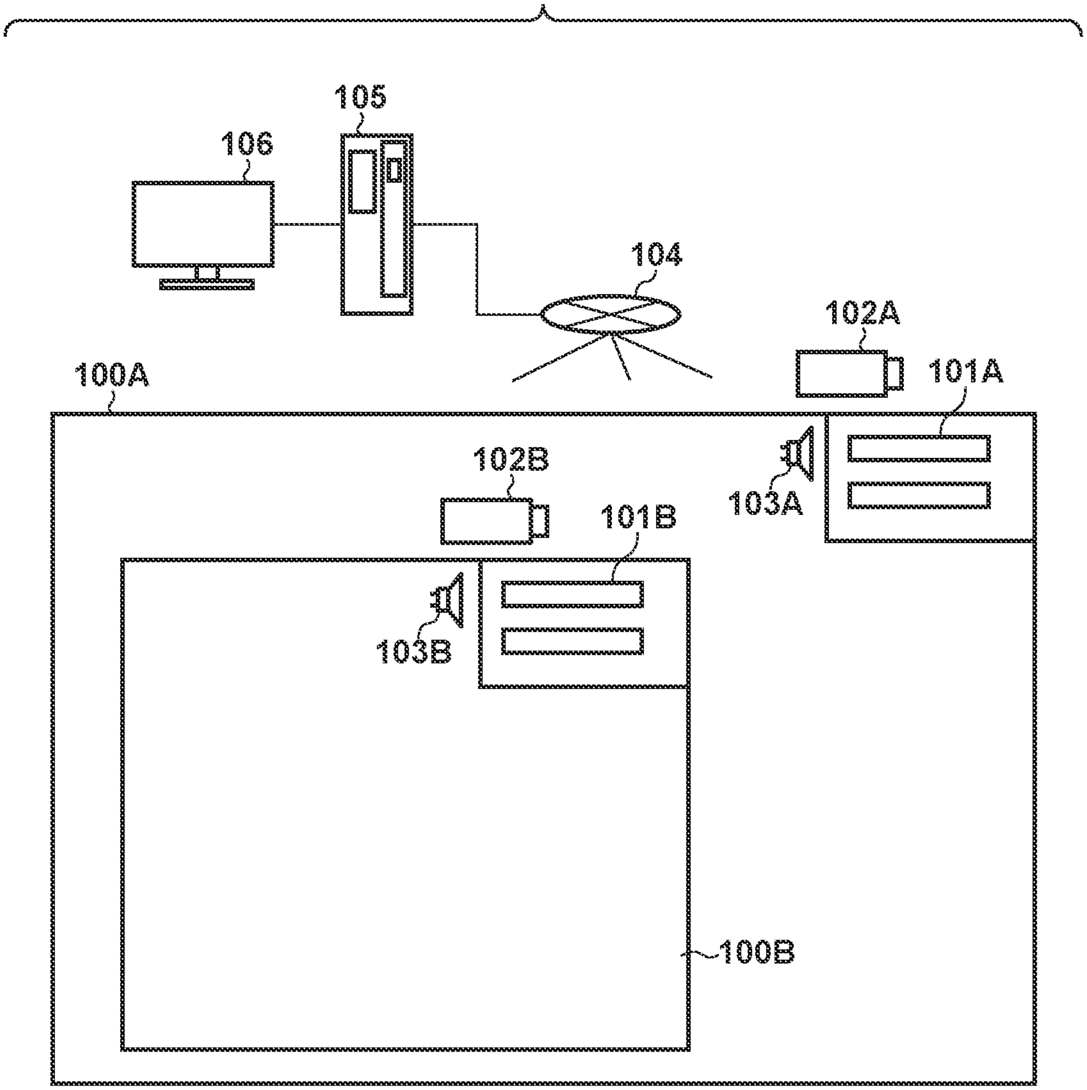
FIG. 1 is a diagram illustrating an example of the overall configuration of an information processing system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

An information processing system according to the first embodiment performs a comparison (first comparison) of a person at a first place and a comparison (second comparison) of a person at a second place reached after passing through the first place. The information processing system, for the first comparison, compares the feature of a person detected from a first image and the feature of a person registered as a person permitted to pass through the first place. In a case where the similarity is equal to or greater than a first threshold, the information processing system performs control to permit passage at the first place. Next, the information processing system, for the second comparison, compares the feature of a person detected from a second image and the feature of a person registered as a person permitted to pass through the second place. In a case where the similarity is less than a second threshold, the information processing system performs control to not permit passage at the second place. Here, the second threshold is greater than the first threshold.

FIG. 1 is a diagram illustrating an example of the overall configuration and arrangement of apparatuses used when authorization is performed using the information processing system according to the present embodiment. In FIG. 1, a building 100B exists inside premises 100A. Also, the premises 100A can be entered via a first place (first gate) 101A, and the building 100B can be entered via a second place (second gate) 101B. Image capture apparatuses 102A and 102B that capture images of people are installed at the first gate 101A and the second gate 101B, respectively. Captured images of people are transmitted to an information processing apparatus 105 via a network 104, and authorization processing for comparing people is performed by the information processing apparatus 105. Then, depending on the authorization result, the information processing apparatus 105 performs control to permit or not permit people to pass through the gates 101A and 101B. Note that in this example, a speaker, a light, a monitor, or a similar notification apparatus (103A and 103B) may be installed at each gate, and the notification of the authorization result can be performed by these notification apparatuses as necessary. The overall processing state of the system can be checked via a monitor 106. Hereinafter, when referring to the image capture apparatuses 102A and 102B without distinction, the image capture apparatus 102 may be used, and when referring to the notification apparatuses 103A and 103B without distinction, the notification apparatus 103 may be used.

The authorization processing according to the present embodiment is processing to check whether a person (person detected from a captured image) imaged by the image capture apparatus 102 is a person that is registered as a person permitted to pass through each place (gate). The information processing apparatus 105 calculates the similarity of a feature by comparing the feature of a person detected from an image and the feature of a registered person, and determines whether or not to permit the detected person to pass through each place on the basis of the calculated similarity. Note that in the description hereinafter, the place where determination of whether the person is a person permitted to pass through is performed by the information processing apparatus 105 is a gate that can permit people to pass through by opening and closing. However, the place is not limited to this, and it is sufficient that the place can permit a person to pass through. Note that hereinafter, a person that is the target of the authorization processing by the information processing apparatus 105 when passing through a gate in this manner may be referred to as a "person entering" or a "person exiting".

The information processing apparatus 105 according to the present embodiment calculates the similarity (a first similarity) between the feature of a person imaged by the image capture apparatus 102A at the first gate 101A and the feature of a register person and determines whether or not the calculated similarity is equal to or greater than the first threshold. Next, in a case where the first similarity is equal to or greater than the first threshold, the information processing apparatus 105 performs control to permit passage at the first place.

Note that here, the information processing apparatus 105 according to the present embodiment may additionally determine whether or not the first similarity is equal to or greater than the second threshold (this will be described below in detail). In this case, the information processing apparatus 105 classifies the authorization result as permitted, deferred, or not permitted on the basis of whether the first similarity is equal to or greater than the second threshold, less than the second threshold but equal to or greater than the first threshold, or less than the first threshold. In this example, in a case where the authorization result is permitted or deferred, the information processing apparatus 105 opens the first gate 101A and permits passage. Also, in a case where the compared person is not registered as a person permitted to pass through the first place, the information processing apparatus 105 sets the authorization result as "not permitted". According to such a configuration, by restricting the passage of people who are "not permitted" and permitting passage of people who are "deferred", congestion can be reduced while maintaining a certain level of accuracy in the security.

Note that in a case where the authorization result is deferred or not permitted, the information processing apparatus 105 may notify the user of the authorization result using the notification apparatus 103A via audio, lighting, vibration, monitor display, or the like. In the example in FIG. 1, the notification apparatus 103 is a notification apparatus installed on the gate and may notify the imaged person via a terminal (smartphone or the like) associated with the person. Other examples include the monitor 106 or the like having this notification function, or the user of the information processing system being notified. In the following examples, unless otherwise described, the person is notified by the notification apparatus 103.

Also, the information processing apparatus 105 according to the present embodiment calculates the similarity (a second similarity) between the feature of a person imaged by the image capture apparatus 102B at the second gate 101B and the feature of a register person and determines whether or not the calculated similarity is less than the second threshold. Next, in a case where the second similarity is less than the second threshold, the information processing apparatus 105 performs control to not permit passage at the second place.

Here, the information processing apparatus 105 can classify the authorization result as permitted or not permitted on the basis of whether the second similarity is equal to or greater than the second threshold or less than the second threshold. In this example, in a case where the authorization result is permitted, the information processing apparatus 105 opens the second gate 101B and permits passage. According to processing in this manner, a more relaxed standard is used to permit passage at the first gate, and a standard which is stricter than the standard used at the first gate is used to permit passage at the second gate, allowing normal security measures to be maintained. The processing for imaging, authorization, gate control, and notification at each gate will be described below in detail.

Note that in the description below, the processing according to the present embodiment is controlled by the information processing apparatus 105. However, the configuration is not particularly limited thereto, and it is sufficient that similar processing can be implemented, for example, by an external apparatus different from the information processing apparatus 105 executing a portion or all of the processing (for example, the image capture apparatus 102 executing the authorization processing described below). Also, the information processing apparatus 105 may be a server, a terminal such as a personal computer, or may indicate a portion or all of an information processing system. In other words, the information processing system according to the present embodiment may indicate the information processing apparatus 105.

Figure 2:
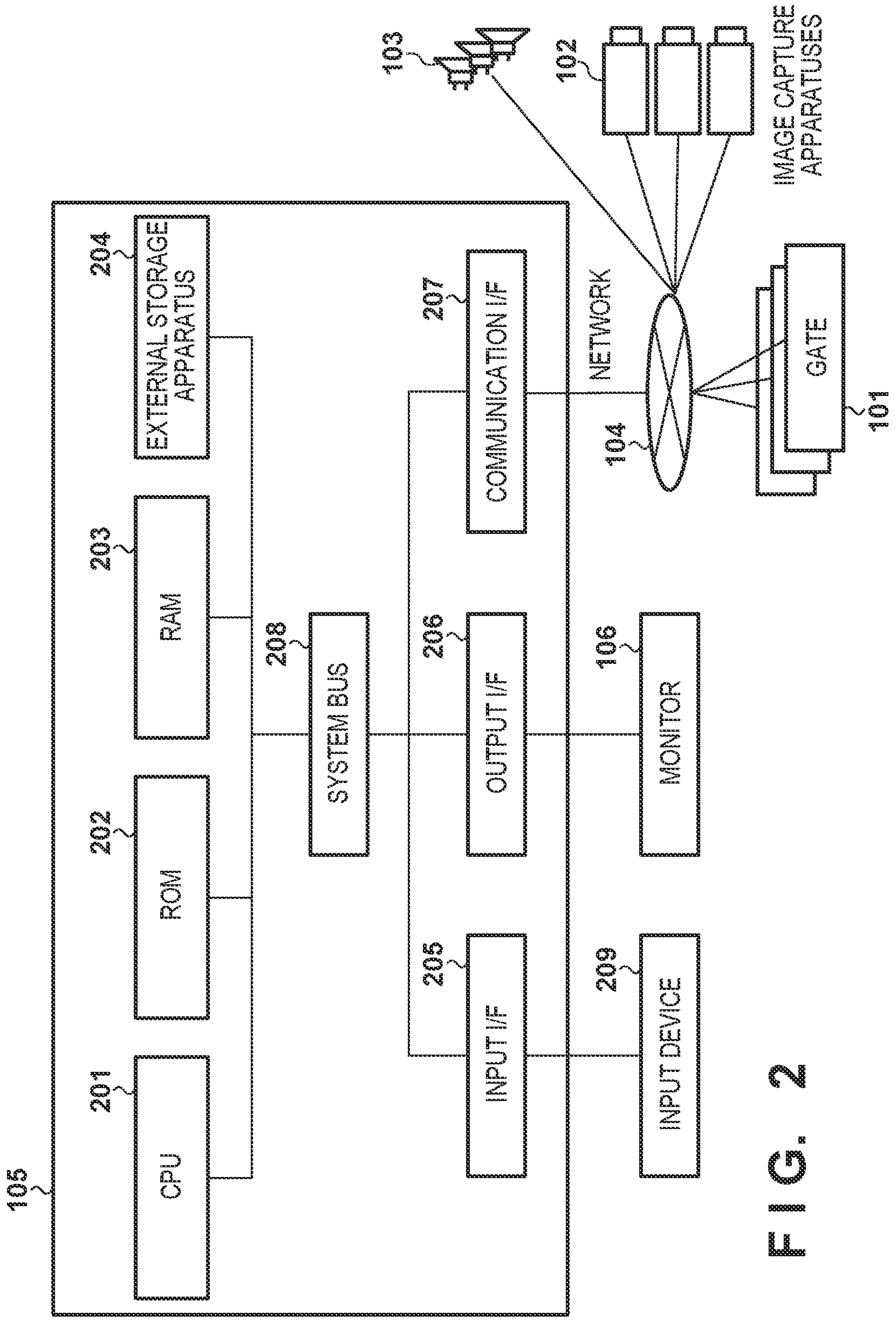
FIG. 2 is a diagram illustrating an example of the hardware configuration of the information processing system.

FIG. 2 is a block diagram illustrating an example of the hardware configuration of the information processing system including the information processing apparatus 105 according to the present embodiment. The information processing apparatus 105 includes a CPU 201, a ROM 202, a RAM 203, an external storage apparatus 204, an input I/F 205, an output I/F 206, and a communication I/F 207. The configuration units are communicatively connected via a system bus 208.

The central processing unit (CPU) 201 controls the entire processing executed by the information processing apparatus 105. The read only memory (ROM) 202 stores programs and parameters not required to be changed. The random access memory (RAM) 203 temporarily stores data supplied from an external apparatus or the like. The external storage apparatus 204 is a storage apparatus such as a hard disk or a memory card installed in a fixed manner in the information processing apparatus 105. Note that the external storage apparatus 204 may include a flexible disk (FD), an optical disk such as a compact disk (CD), a magnetic or optical card, an IC card, a memory card, or the like that can be insert and removed from the information processing apparatus 105.

Note that the functions and the processing of the information processing apparatus 105 described below are implemented by the CPU 201 reading out a program stored in the ROM 202 or the like and executing the program.

The input I/F 205 is an interface with an input device 209, such as a pointing device or a keyboard for inputting data, that receives an operation from the user. The output I/F 206 is an interface with the monitor 106 for displaying data held by or supplied by the information processing apparatus 105 or the like. The communication I/F 207 connects to the network 104. The CPU 201 transmits and receives data between the gates 101, the image capture apparatuses 102, and the notification apparatuses 103 via the network 104. The gates 101, the image capture apparatuses 102, and the notification apparatuses 103 have a communication function and connect to the network 104 to communicate with an external apparatus.

Figure 3:
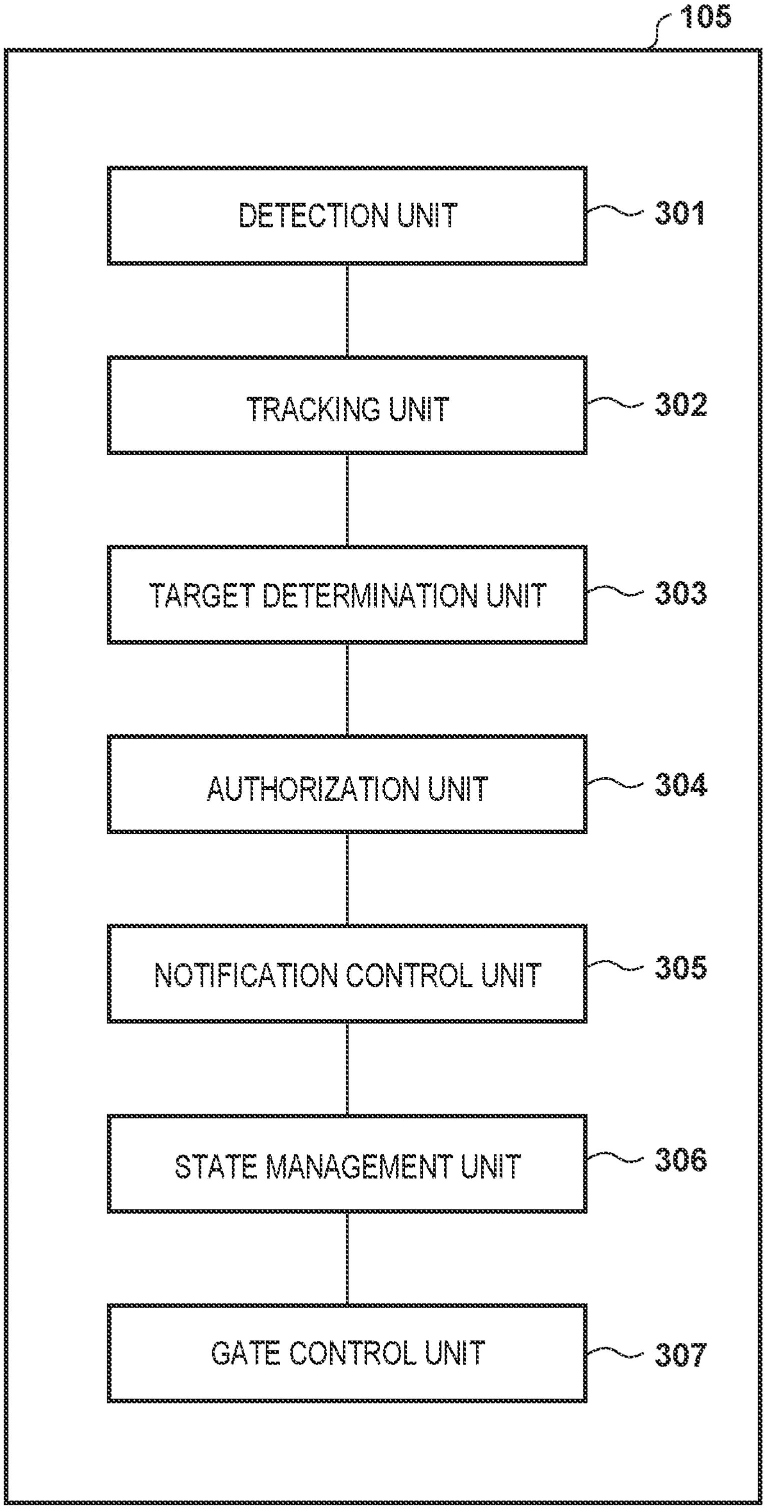
FIG. 3 is a block diagram illustrating an example of the functional configuration of the information processing apparatus.

FIG. 3 is a block diagram illustrating an example of the functional configuration of the information processing apparatus 105 according to the present embodiment. The information processing apparatus 105 includes a detection unit 301, a tracking unit 302, a target determination unit 303, an authorization unit 304, a notification control unit 305, a state management unit 306, and a gate control unit 307. A program for executing the processing executed by these functional units is stored in the ROM 202. The functional units included in the information processing apparatus 105 will be described below.

Database for Managing People

FIG. 4A is an example of a database for managing the information of people stored by the information processing apparatus 105 according to the present embodiment. The database according to the present embodiment stores personal ID, authorization state corresponding to personal ID, entry state, information relating to authority to pass through each gate, and facial feature value. Note that the information stored in the database is not limited thereto, and supplementary information such as the name, age, and gender of the people may also be stored, for example.

The personal ID according to the present embodiment is identification information (ID) that uniquely identifies a person. As the personal ID, an ID used outside of the system, such as a company employee number, may be used unchanged or a separate new ID may be prepared. The authorization state according to the present embodiment indicates the authorization result at each gate for the corresponding person. The authorization state is "unauthorized" when the person is not present at the gate, such as before entering the gate or after exiting the gate and "authorized with deferral" or "authorized" depending on the authorization result at the time of entry when the person has passed through the gate and entered.

The entry state according to the present embodiment is information indicating up to which gate the person has entered. By referencing the entry state, between which gates is the corresponding person located at can be known and which gate the person will likely go to next can be known. As the entry state, for example, "has not entered" is assigned when the person has not passed through the first gate and "first gate" is assigned when the person has passed through the first gate but not passed through the second gate. The information relating to authority to pass through each gate is information indicating whether the person has authority to pass through (whether the person is a person permitted to pass through) each gate and is registered in advance. In the present embodiment, information relating to a person without authority to pass through the first gate is registered in the database and managed. For example, in a case where more than one office uses the same system and the authority to pass through the first gate is set per office, passage authority is also registered per office. For example, a person with an ID may have the authority to pass through the first gate of xx office but not have the authority to pass through the first gate of yy office. Also, for example, there may be cases where, for a visitor or the like that is given temporary passage authority (made a person permitted to pass through), the passage authority is changed after the person exits or the setting is held for a certain time period. Note that the facial feature value of the person used in comparison is obtained by extracting the facial feature from a face imaged in advance and registered.

Note that in the present embodiment, all of the data is stored in one table. However, the data may be managed in a different manner. For example, the database may be divided into one database per gate or divided into a facial feature database to facilitate quick searching using the facial feature as a key. Also, the information processing apparatus 105 may be configured to generate a database for managing the data of only people with "authorized" or "authorized with deferral" as the authorization state upon entry.

Authorization Processing When Entering the First Gate

Figure 5A:
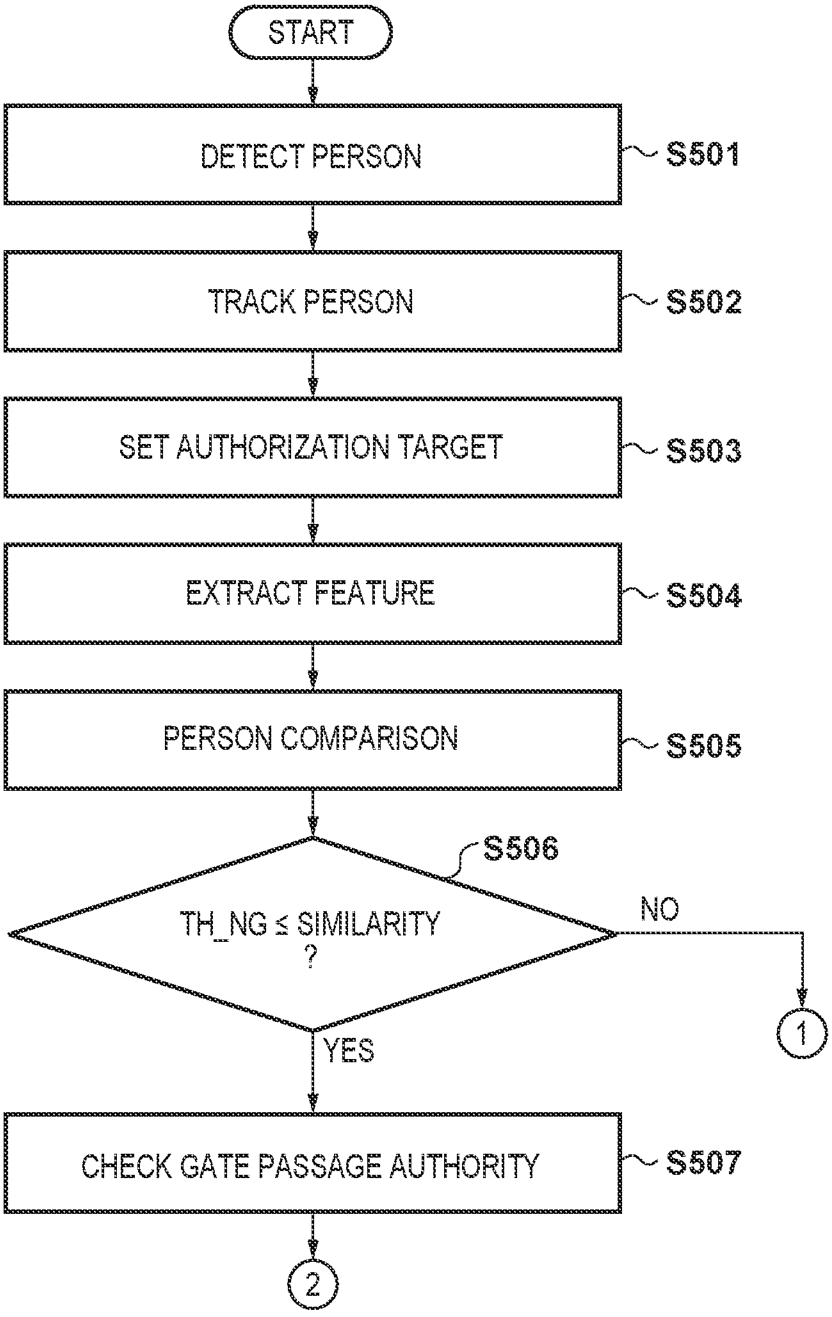
FIGS. 5A and 5B are flowcharts illustrating an example of authorization processing executed upon entry at a first gate.
Figure 5B:
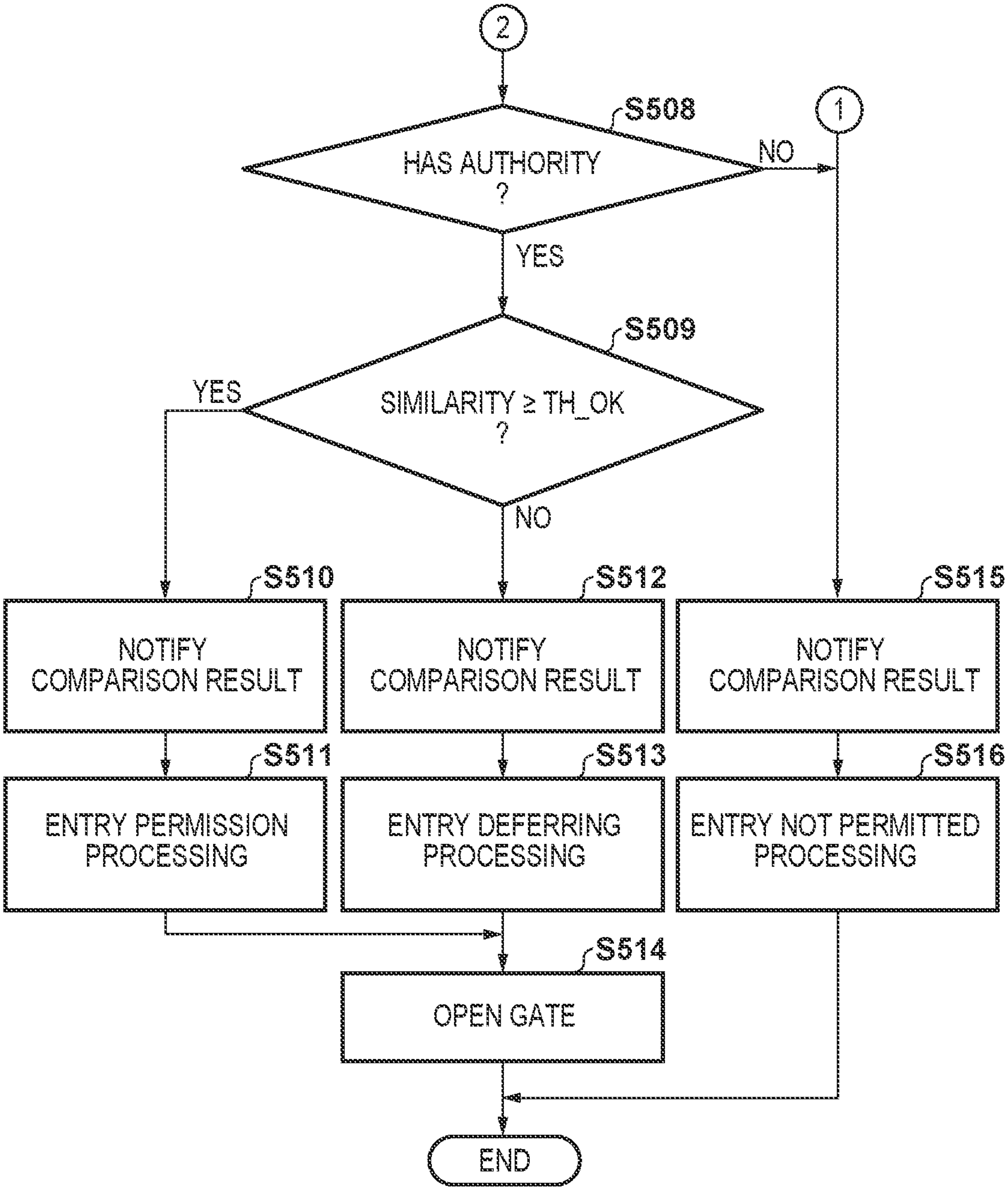

FIGS. 5A and 5B are flowcharts illustrating an example of the authorization processing executed by the information processing apparatus 105 according to the present embodiment upon entry at the first gate 101A. In the present embodiment, the processing corresponding to the steps in the flowchart described below may be implemented by software using the CPU 201 or implemented by hardware such as an electronic circuit. This also applies to the implementing means in the flowcharts described below in reference to other diagrams unless specifically described. Note that the processing in FIGS. 5A and B is started from step S501 when a person is detected from a captured image with the information processing system according to the present embodiment in an operating state.

First, in step S501, the detection unit 301 detects a region of a person in an image captured by the image capture apparatus 102A. Here, the number of people detected by the detection unit 301 is one, but in a case where a plurality of people are detected, similar processing can be executed for each one. In step S502, the tracking unit 302 tracks the person detected by the detection unit 301 across a plurality of frames. The tracking unit 302 at all times stores a video of a predetermined number (can be set to any number) of the most recent frames while tracking the person. Also, in a case where the person being tracked goes outside the field of view and becomes undetectable, the tracking unit 302 stops tracking the person. The detection processing of a person by the detection unit 301 and the tracking processing of a person by the tracking unit 302 can be executed by typically used known person detection/tracking techniques. Thus, these will not be described in detail here.

In step S503, the target determination unit 303 sets a person in an image as the target person for authorization. In this example, the target determination unit 303 sets a person being tracked that has reached a predetermined position in an image as the target person for authorization. Here, as the predetermined position, a position that is suitable as the position of a target person for authorization at the first gate, for example, in a rectangular region of a predetermined shape with the center of an image as the center position, is set when the information processing system is installed.

In step S504, the authorization unit 304 extracts a feature of the target person. Note that in the present embodiment described below, a facial feature value is extracted from the face region of a person and comparison is performed on the basis of this facial feature value. However, no such limitation is intended, and it is sufficient that a comparison of a person can be performed. Also, the authorization unit 304 extracts the facial feature of the person from each frame of a predetermined number of the most recent stored images. In step S505, the authorization unit 304 compares each facial feature extracted in step S504 with the facial feature registered in the database in advance and outputs the face with the highest similarity from among all of the pairs of registered faces and predetermined number of facial features.

In step S506, the authorization unit 304 determines whether or not the highest similarity (hereinafter, also referred to as the first similarity) corresponding to the face output in step S505 is less than the first threshold (a not permitted threshold TH_NG). In a case where the first similarity is equal to or greater than the not permitted threshold, the processing proceeds to step S507. In a case where the first similarity is less than the not permitted threshold, the processing proceeds to step S515.

In step S507, the authorization unit 304 checks whether the person calculated with the first similarity has the authority to pass through the first gate 101A (in this example, by referencing the database). In step S508, in a case where the person has passage authority, the authorization unit 304 proceeds the processing to step S509. In a case where the person does not have passage authority, the authorization unit 304 proceeds the processing to step S515.

In step S509, the authorization unit 304 determines whether or not the first similarity is equal to or greater than the second threshold (permitted threshold TH_OK). In a case where the first similarity is equal to or greater than the permitted threshold, the processing proceeds to step S510. In a case where the first similarity is less than the permitted threshold, the processing proceeds to step S512.

In a case where the processing arrives at step S510, the authorization result is set to "permitted", and the notification control unit 305 notifies the person entering that the authorization result is "permitted" via audio or lighting. In step S511, the state management unit 306 changes the authorization state in the database managing the person to "authorized" and the entry state to "first gate" as part of the entry permission processing. Then, the processing proceeds to step S514. In step S514, the gate control unit 307 opens the first gate 101A and ends the processing in FIGS. 5A and 5B.

In a case where the processing arrives at step S512, the authorization result is set to "deferred", and the notification control unit 305 notifies the person entering that the authorization result is "deferred" via audio or lighting. This notification is to make the person entering aware that the authorization result is "deferred" and not "permitted". Thus, the notification control unit 305 can perform notification control to make the notification corresponding to "permitted" and the notification corresponding to "deferred" different from one another. For example, the notification control unit 305 may not issue a notification in the case of "permitted" and may issue a notification only in the case of "deferred". Also, the notification control unit 305 may reference a terminal such as a smart device associated with the person entering in the database and notify the person entering by playing a message or audio using the terminal. In step S513, the state management unit 306 changes the authorization state in the database managing the person to "authorized with deferral" and the entry state to "first gate" in entry deferred processing.

In step S514, the gate control unit 307 opens the first gate 101A and ends the processing in FIGS. 5A and B.

In a case where the processing arrives at step S515, the authorization result is set to "not permitted", and the notification control unit 305 notifies the person entering that the authorization result is "not permitted" via audio or lighting. In step S516, the state management unit 306 executes entry not permitted processing and ends the processing in FIGS. 5A and B. The entry not permitted processing according to the present embodiment includes keeping the first gate 101A closed. The entry not permitted processing may include processing to notify a predetermined contact (for example, a security guard) of the "not permitted" result or processing to notify the person entering to direct them to a predetermined position (for example, guide the person to a reception area where there is an attendant).

Note that in the example described here, a comparison of a person is performed via a 1:N authentication that calculates the similarity using a person detected in an image and a facial feature registered in the database in advance. However, the method is not particularly limited thereto, and it is sufficient that a comparison of a person can be performed. For example, a comparison of a person may be performed via a 1:1 authentication that compares a person registered in a medium with a person detected in an image, with a reading apparatus (not illustrated) that reads a medium, such as an employee ID card, held by the person being compared being provided on the gate. In this case, whether or not the person entering is registered as a person permitted to pass through can be checked by the reading apparatus reading the medium. In a case where the information processing apparatus 105 determines that the person entering is a person permitted to pass through using the reading apparatus, for example, the information processing apparatus 105 may image the person entering and add a feature of the facial region to the database as a feature of the person permitted to pass through. Also, in a case where a person guided to the reception where an attendant is stationed due to an authorization result of "not permitted" leaves without going to the reception (without being subjected to the checking processing at the reception), the state management unit 306 may execute processing to register an image corresponding to the person to the database on a cautionary list.

Note that the permitted threshold TH_OK (second threshold) and the not permitted threshold TH_NG (first threshold) described above used in the present embodiment are not particularly limited to their values, and it is sufficient that the second threshold is set higher than the first threshold. These thresholds may be set by the user as a desired value depending on the conditions or may be set on the basis of the false rejection rate (FRR) or false acceptance rate (FAR).

Also, in a case where only people with the authority to pass through the first gate are registered in the database, steps S507 and S508 are not performed, and the processing moves to step S509 instead of step S507. In this manner, in the example in FIGS. 5A and B, a check is performed in steps S507 and S508 as to whether or not the person entering has gate passage authority after the person comparison in step S505. However, the flow may be changed so that only people with gate passage authority are taken as a target for person comparison.

Authorization Processing When Entering the Second Gate

Figure 6:
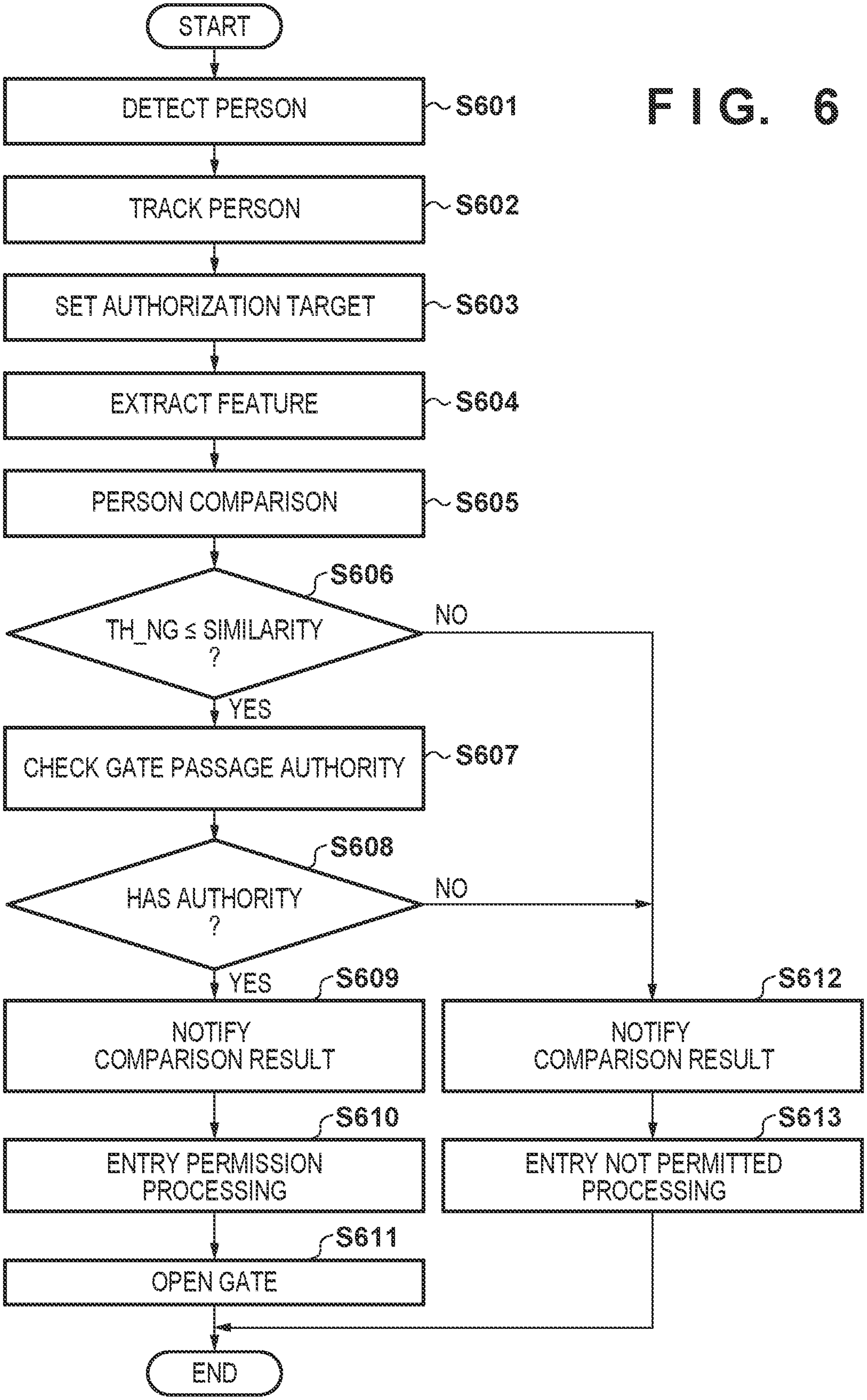
FIG. 6 is a flowchart illustrating an example of authorization processing executed upon entry at a second gate.

FIG. 6 is a flowchart illustrating an example of the authorization processing executed by the information processing apparatus 105 according to the present embodiment upon entry at the second gate 101B. At the first gate 101A, determination is performed in which the authorization result is categorized into three levels, permitted, deferred, and not permitted. However, at the second gate 101B, determination is performed using two levels, permitted and not permitted. In a case where the same permitted threshold TH_OK is used at the first gate 101A and the second gate 101B, a person assigned "deferred" upon entry at the first gate 101A cannot pass through the second gate 101B with a similar comparison score. From this perspective, the notification control unit 305 notifies the person given "deferred" upon entry at the first gate 101A so prompt proactive behavior to ensure that authorization is successful at the second gate 101B. The notification may be performed when "deferred" is determined at the first gate 101A or may be performed when performing comparison at the second gate of a person determined as "deferred". Examples of proactive behavior include remaining more stationary that when passing through the first gate and facing the image capture apparatus, removing a hat, sunglasses, a mask, or other article of clothing if worn, and the like.

Steps S601 to S604 are similar to steps S501 to S504 in FIGS. 5A and B. In step S605, the authorization unit 304 compares the facial feature of the person with an authorization state of "authorized" or "authorized with deferral" and an entry state of "first gate", from among the facial features registered in the database in advance, and outputs the face with the highest similarity. In step S606, the authorization unit 304 determines whether or not the highest similarity (hereinafter, also referred to as the second similarity) corresponding to the face output in step S605 is greater than the second threshold (permitted threshold TH_OK). In a case where the second similarity is equal to or greater than the permitted threshold, the processing proceeds to step S606. In a case where the second similarity is less than the permitted threshold, the processing proceeds to step S612.

In step S607, the authorization unit 304 checks whether the person calculated with the second similarity has the authority to pass through the second gate 101B (in this example, by referencing the database). In step S608, in a case where the person has passage authority, the authorization unit 304 proceeds the processing to step S609. In a case where the person does not have passage authority, the authorization unit 304 proceeds the processing to step S612.

In a case where the processing arrives at step S609, the comparison result is set to "permitted", and the notification control unit 305 notifies the person entering that the comparison result is "permitted" via audio or lighting. In step S610, the state management unit 306 changes the authorization state in the database managing the person to "authorized and deferred" and the entry state to "second gate" as part of the entry permission processing. In step S611, the gate control unit 307 opens the second gate 101B and ends the processing in FIG. 6.

In a case where the processing arrives at step S612, the comparison result is set to "not permitted", and the notification control unit 305 notifies the person entering that the comparison result is "not permitted" via audio or lighting. In step S613, the state management unit 306 executes entry not permitted processing and ends the processing in FIG. 6. The entry not permitted processing according to FIG. 6 includes keeping the second gate 101B closed. Also, for a person with an authorization result of "not permitted", the state management unit 306 may execute processing to register an image corresponding to the person to the database on a cautionary list.

In the present embodiment, a plurality of facial features obtained by tracking and a facial feature registered in the database in advance are compared, and the highest similarity from among a plurality of similarities is used. However, the comparison processing is not particularly limited thereto. For example, a predetermined number of people may be registered in the database, and M number of facial features may be obtained by tracking. Then, M number of similarities may be calculated for each person registered in the database. In this case, a comparison using the median value or average value of the calculated similarities may be performed, and any method may be used as long as a person in an image is compared.

Also, in the present embodiment, the same permitted threshold used for comparison at the second gate 101B is used for people given "deferred" and "permitted" at the first gate 101A. However, the permitted threshold may be different depending on the authorization result at the first gate 101A. Also, the same permitted threshold is used as the permitted threshold of the first gate 101A and the permitted threshold of the second gate 101B. However, a different permitted threshold may be used for each comparison depending on the image capture apparatus installation situation (outside light, angle of elevation of the installation, and the like) or the conditions desired by the user.

By restricting who can be an authorization target at the second gate to people with an authorization state of "authorized" or "authorized and deferred" or to people with an entry state of "first gate", authorization can be performed quicker and with more accuracy than when performing authorization targeting all of the people registered in advance. However, in a case where the number of people registered in advance is low, to simplify processing, authorization may always be performed targeting all of the people. Also, in the example in FIG. 6, a check is performed in steps S607 and S608 as to whether or not the person entering has gate passage authority after the person comparison in step S605. However, the flow may be changed so that only people with gate passage authority are taken as a target for person comparison.

Authorization Processing When Exiting the Second Gate

Figure 7:
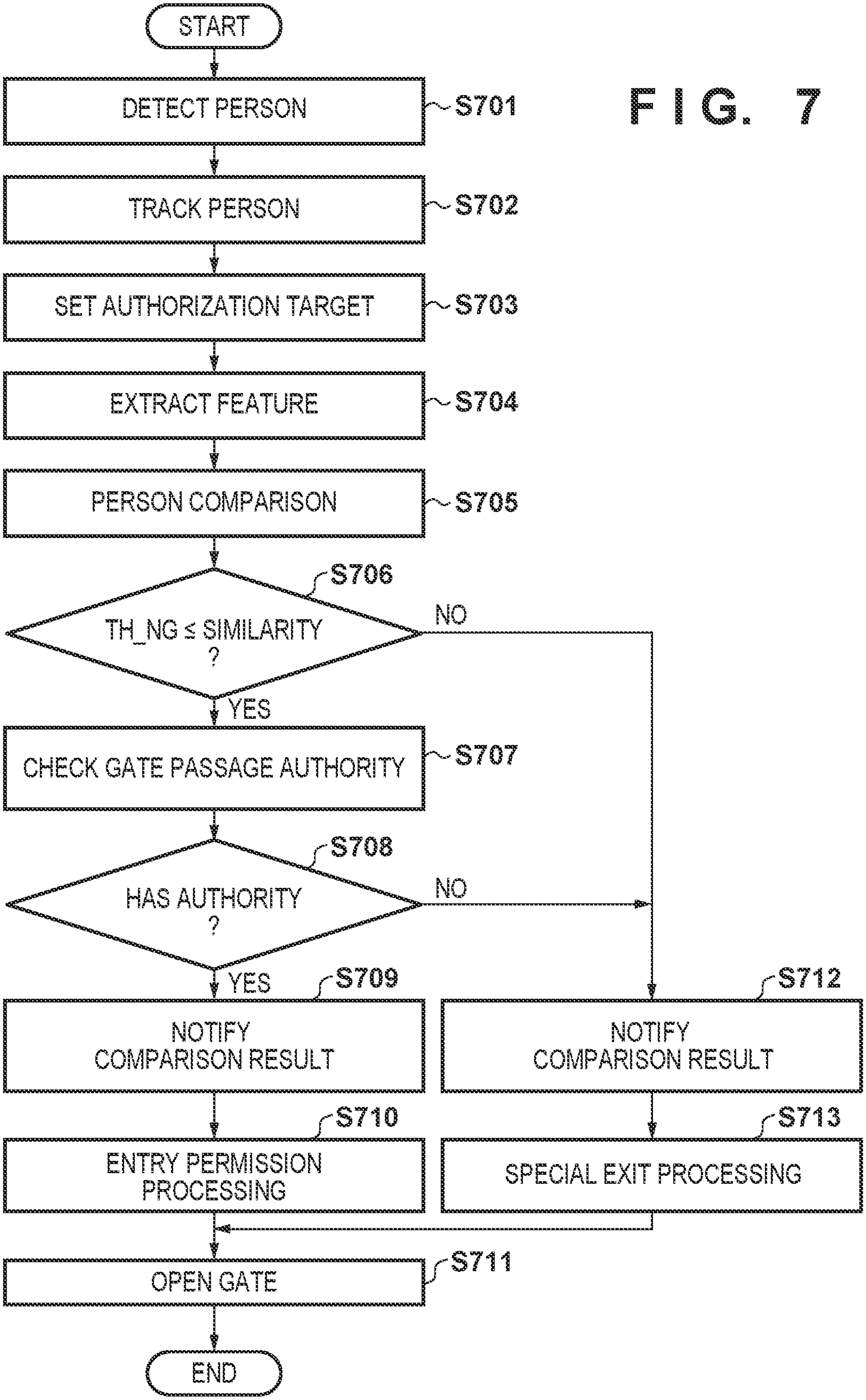
FIG. 7 is a flowchart illustrating an example of authorization processing executed upon exit at the second gate.

FIG. 7 is a flowchart illustrating an example of the authorization processing executed by the information processing apparatus 105 according to the present embodiment upon exit at the second gate 101B. Steps S701 to S708 are similar to steps S601 to S608 in FIG. 6. In a case where a person passes through each gate and exits, the information processing apparatus 105 according to the present embodiment can perform a comparison via processing similar to the processing upon entry and output an authorization result.

In a case where the processing arrives at step S709, the comparison result is set to "permitted", and the notification control unit 305 notifies the person exiting that the comparison result is "permitted" via audio or lighting, as in step S609. In step S710, the state management unit 306 changes the entry state in the database managing the person to "first gate" as part of the exit permission processing. In step S711, the gate control unit 307 opens the second gate 101B and ends the processing in FIG. 7.

In a case where the processing arrives at step S712, the comparison result is set to "not permitted", and the notification control unit 305 notifies the person exiting that the comparison result is "not permitted" via audio or lighting. In step S713, the state management unit 306 executes special exit processing and ends the processing in FIG. 7. The special exit processing according to the present embodiment may include processing to notify a predetermined contact, such as notifying a security guard and prompting the security guard to perform manual exit processing to avoid the problem of a person being trapped inside the building. Also, the special exit processing may include processing to execute an authorization processing using a non-illustrated reading apparatus to read a code number, ID, or the like. In this manner, when a person exiting is allowed to exit via the special exit processing, the entry state in the database for managing people is changed to "first gate", the opening of the second gate 101B in step S711 is performed, and the processing in FIG. 7 ends.

Authorization Processing When Exiting the First Gate

Figure 8:
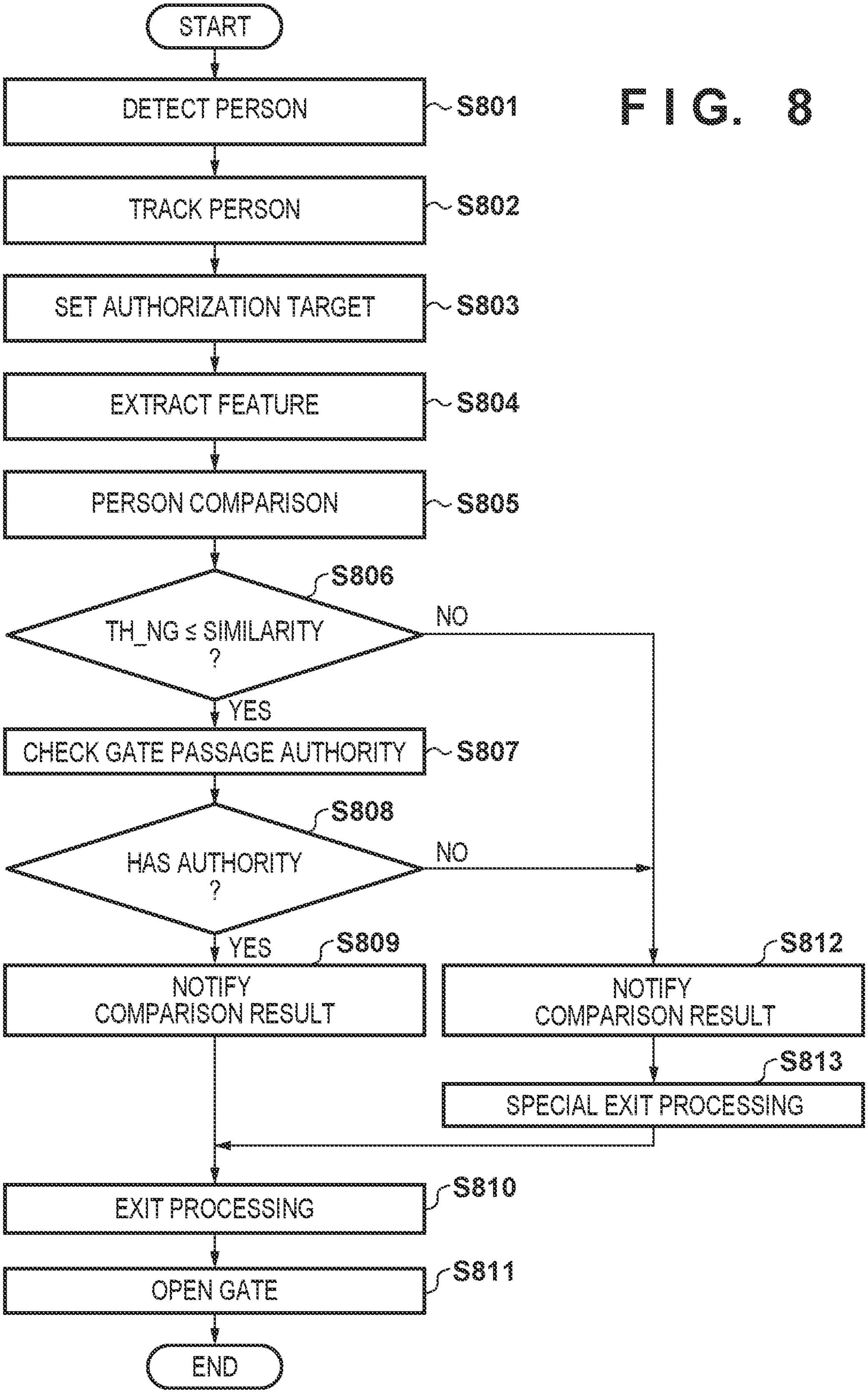
FIG. 8 is a flowchart illustrating an example of authorization processing executed upon exit at the first gate.

FIG. 8 is a flowchart illustrating an example of the authorization processing executed by the information processing apparatus 105 according to the present embodiment upon exit at the first gate 101A. Steps S801 to S809 are similar to steps S701 to S709 in FIG. 7. Also, steps S812 and S813 are similar to steps S712 and S713 in FIG. 7.

After the processing of step S809 or S813, the processing proceeds to step S810 where the state management unit 306 changes the authorization state in the database managing the person to "unauthorized" and the entry state to "has not entered" as part of the exit processing. In step S811, the gate control unit 307 opens the first gate 101A and ends the processing in FIG. 8.

According to such a configuration, at the first-stage authorization gate, a person can be allowed to enter depending on whether or not a comparison similarity is equal to or greater than the first threshold, and at the second-stage authorization gate, a person can be allowed to enter depending on whether or not a comparison similarity is equal to or greater than the second threshold, which is greater than the first threshold. Accordingly, congestion can be prevented while maintaining a certain level of security accuracy in the first-stage authorization, and the normal level of security accuracy can be ensured in the second-stage authorization.

Second Embodiment

In the first embodiment, comparison is performed using a facial feature of a person registered in advance when comparing a person. In the present embodiment, the face when entering the first gate is additionally registered in the database and used thereafter in the comparison. The information processing apparatus 105 holds the (facial) feature of a person with a similarity equal to or greater than the first threshold upon entry at the first gate and performs a comparison at the second gate using the features added and held as the facial feature pre-registered in the database. Also, the information processing apparatus 105 changes the permitted threshold used for entry of the second gate depending on the first similarity calculated upon entry of the first gate. As described below, this can reduce the false rejection rate of registered people failing the authorization.

Also, even when the person entering is a person permitted to pass through and the person being referenced for comparison is the person in question, there may be some cases where, due to aging of the facial feature or the like, the similarity output as the comparison result is permanently reduced. From this perspective, the state management unit 306 according to the present embodiment can perform a determination of whether or not the first similarity upon authorization is less than a third threshold (update threshold) greater than the second threshold and, in a case where the first similarity is less than the third threshold, update the facial feature held in the database.

The overall configuration and arrangement of the apparatuses used to perform authorization using the information processing system according to the present embodiment and the hardware configuration and functional configuration of the information processing apparatus 105 are similar to those in the first embodiment. Thus, these will not be described here.

Database for Managing People

FIG. 4B is an example of a database for managing the information of people stored by the information processing apparatus 105 according to the present embodiment. The database in FIG. 4B is the database in FIG. 4A of the first embodiment with temporary permitted thresholds and temporary facial features additionally added. The temporary permitted threshold is used when temporarily changing the threshold for authorization permission according to an authorization state upon gate entry, and the temporary facial feature is used when temporarily registering a facial feature. These will be described below in detail.

Authorization Processing When Entering the First Gate

The authorization processing executed by the information processing apparatus 105 according to the present embodiment upon entry to the first gate 101A is basically similar to the processing executed in the first embodiment illustrated in FIGS. 5A and B. However, the processing details of the entry permission processing of step S511 and the entry deferred processing of step S513 are different from the first embodiment and will be described below.

Entry Permission Processing

Figure 9:
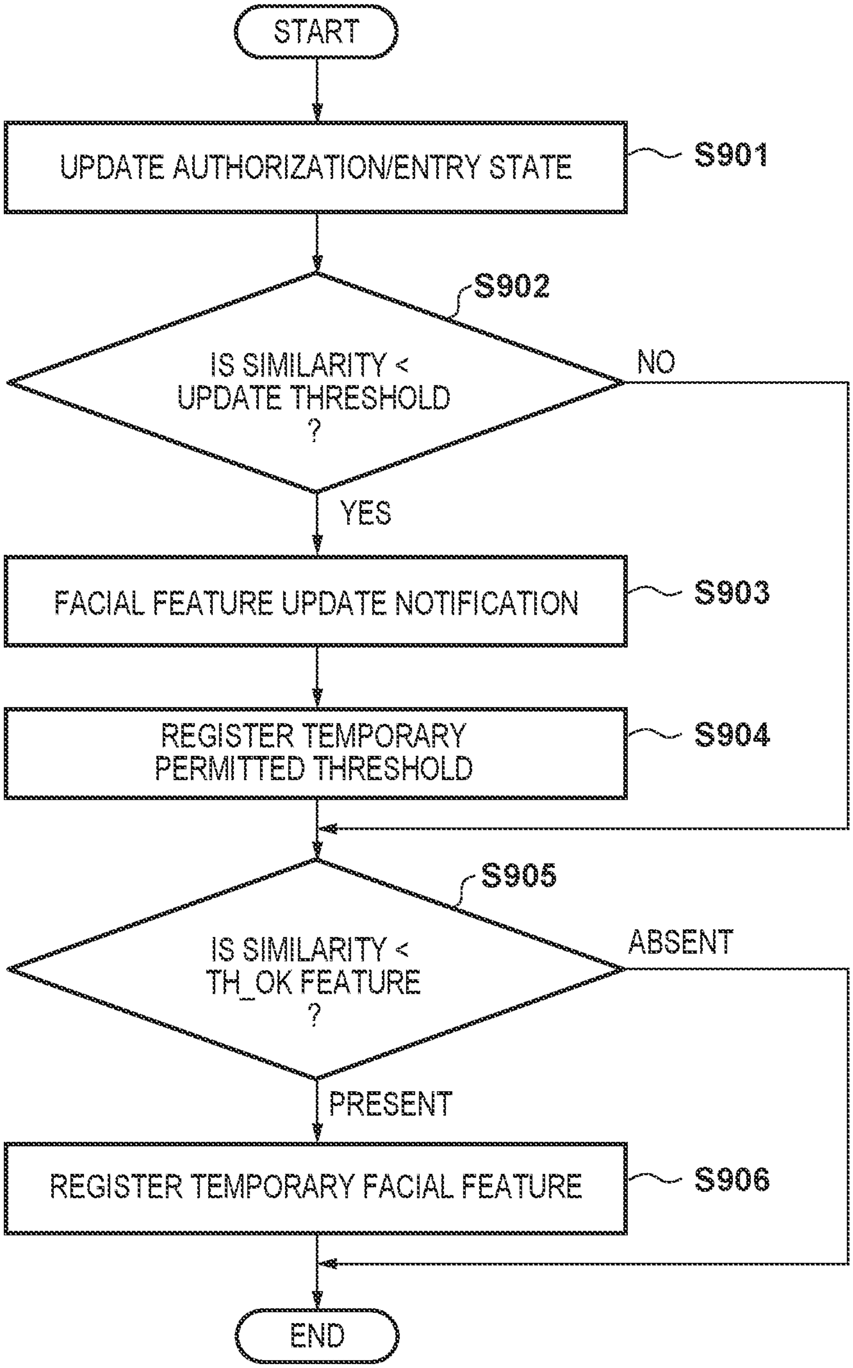
FIG. 9 is a flowchart illustrating an example entry permission processing.

FIG. 9 is a flowchart illustrating an example of the details of the entry permission processing executed by the state management unit 306 in step S511 according to the second embodiment.

First, in step S901, the state management unit 306 changes the authorization state in the database managing the person to "authorized" and the entry state to "first gate". This processing is similar to the processing in step S511 of the first embodiment.

In step S902, the state management unit 306 determines whether or not the first similarity when authorization is performed is less than the update threshold. In a case where the first similarity is less than the update threshold, the processing proceeds to step S903. Otherwise, the processing proceeds to step S905. Here, as the update threshold, an update threshold TH_OK+$\alpha$ is used, which is a threshold with a margin obtained by adding a predetermined margin value $\alpha$ to the permitted threshold (TH_OK).

In step S903, the notification control unit 305 notifies the person entering, prompting the person entering to update the registered facial feature. The notification control unit 305 may notify the person entering at that place via the notification apparatus 103 with lighting or audio and may notify the person entering using a portable terminal owned by the person entering or a (company) email address corresponding to the person entering. Also, the notification control unit 305 may notify the system administrator, prompting them to notify the person entering of a date and time to retake a face image with the system administrator.

In step S904, the state management unit 306 registers the temporary permitted threshold in the database. In the case of updating the registered facial feature, since the similarity is expected to be permanently lowered until an update is performed, as a temporary measure, the permitted threshold is temporarily lowered. The temporary permitted threshold, for example, may be a fixed value such as a threshold (TH_OK-$\beta$), which is a predetermined amount ($\beta$) less than the permitted threshold (TH_OK), or a dynamic value such as a threshold (SIM-$\beta$), which is a predetermined amount ($\beta$) less than the first similarity (SIM) when authorization is performed. The value of $\beta$ can be set as desired by the user.

In the present embodiment, in step S502, a person is tracked, and in step S504, a plurality of facial features are extracted from a plurality of images of one person. However, in the determination of a comparison result in step S506, the similarity of the face which is the most similar is used. In step S905, the state management unit 306 checks whether or not there is a facial feature with a first similarity less than the permitted threshold (TH_OK) among the facial features in the plurality of images. In a case where there is a facial feature with a first similarity less than the permitted threshold, the processing proceeds to step S906. Otherwise, the entry permission processing in FIG. 9 ends. In step S906, the state management unit 306 registers the feature with the first similarity less than the permitted threshold as a temporary facial feature, and the entry permission processing ends.

Also, even when the person entering is a person permitted to pass through and the person being referenced for comparison is the person in question, if the face is facing sideward or downward or in a similar predetermined state not conducive for comparison, it is plausible that that the similarity obtained by calculation will be low. Also, even when the person is the person in question, if it is a predetermined state where, for example, the hair style or accessories such as glasses are different from those in the feature image registered in advance, it is plausible that the similarity obtained by calculation will be low. By registering the facial feature upon entry in such a predetermined state as a temporary facial feature and using it in the subsequent comparison when executing authorization processing, these daily changes in the person can be accommodated, and the false rejection rate can be reduced.

Note that in this example, a feature with a similarity that is less than the permitted threshold is registered as a temporary facial feature. However, a feature with a similarity that is equal to or greater than the permitted threshold may be registered as a temporary facial feature. Also, a face determined to be in a predetermined state, such as a face facing behind or straight down so that the face is not clearly seen, is not appropriate for facial authentication and is preferably not registered in as a temporary facial feature. A face in such a predetermined state may be excluded in step S905 or excluded when extracting a facial feature in step S504. Also, in the present embodiment, a temporary facial feature is registered. However, a facial feature may be registered (updated) as a non-temporary facial feature. In this manner, the information processing apparatus 105 may determine whether a feature in an image captured upon entry at the first gate is inappropriate to be used as a feature of a person, the subject, registered as a person permitted to pass through and may hold only images that are not inappropriate. The determination of whether it is inappropriate may be a determination of whether the face is not clearly seen as described above or a determination of whether or not a condition set by the user is satisfied.

Entry Deferred Processing

Figure 10:
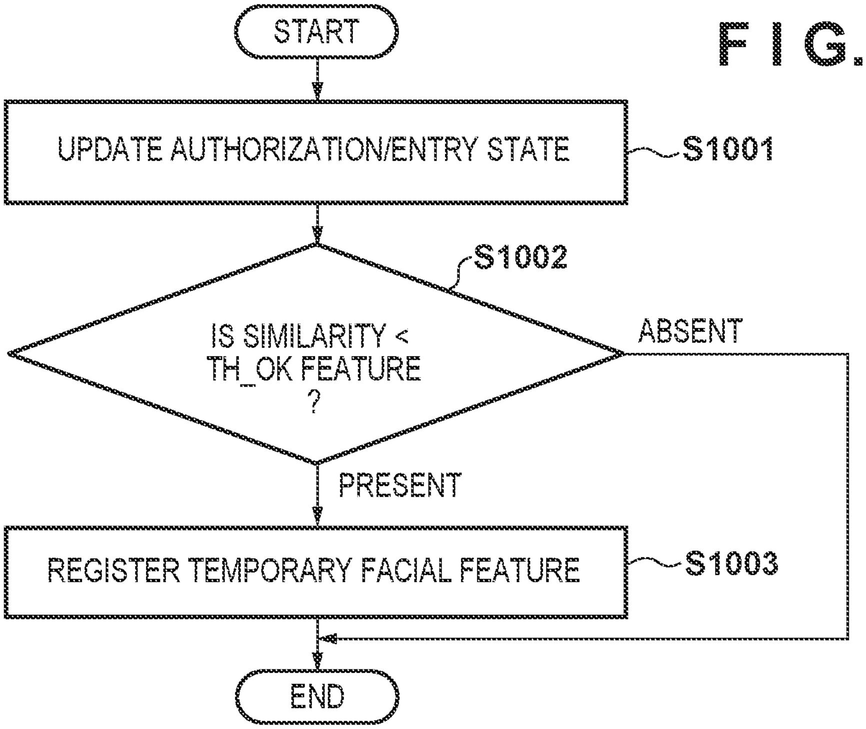
FIG. 10 is a flowchart illustrating an example of entry deferring processing.

FIG. 10 is a flowchart illustrating an example of the details of the entry deferred processing executed by the state management unit 306 in step S513 according to the second embodiment. First, in step S1001, the state management unit 306 changes the authorization state in the database managing the person to "authorized and deferred" and the entry state to "first gate". This processing is similar to the processing in step S513 of the first embodiment.

As in step S905, in step S1002, the state management unit 306 checks whether or not there is a facial feature with a first similarity less than the permitted threshold (TH_OK) among the facial features in the plurality of images.

In a case where there is a facial feature with a first similarity less than the permitted threshold, the processing proceeds to step S1003. Otherwise, the entry hold processing in FIG. 10 ends. In step S1003, the state management unit 306 registers the feature with the first similarity less than the permitted threshold as a temporary facial feature, and the entry deferred processing ends. In this example, the registered temporary facial feature is not used while the authorization state is "authorized with deferral" and used after the authorization state changes to "authorized". This will be described below.

Authorization Processing When Entering the Second Gate

The authorization processing executed by the information processing apparatus 105 according to the present embodiment upon entry at the second gate 101B is executed as in the flowchart illustrated in FIGS. 5A and B according to the first embodiment. However, the person comparison in step S605, the similarity comparison in step S606, and the entry permission processing in step S610 are different in terms of the processing details. The processing different from the first embodiment will be described below.

The authorization unit 304 in step S605 according to the present embodiment performs a facial feature comparison of the temporarily registered facial feature with "authorized" as the authorization state in addition to the facial feature registered in the database in advance with "authorized" or "authorized and deferred" as the authorization state and obtains the registered face with the highest similarity.

In step S606, the authorization unit 304 determines whether or not the highest similarity corresponding to the face output in step S605 is greater than the second threshold (permitted threshold TH_OK). However, when a temporary permitted threshold is registered, the temporary permitted threshold is used instead of the permitted threshold. The entry permission processing is similar to the entry permission processing in FIG. 9. However, in a case where the authorization state is already "authorized", the authorization state update of step S901 may be skipped, or it may be overwritten with "authorized" again.

Authorization Processing When Exiting the Second Gate

The flowchart illustrating an example of the authorization processing executed by the information processing apparatus 105 according to the present embodiment upon exit at the second gate 101B is similar to the flowchart in the first embodiment. However, in the exit permission processing of step S710, in addition to the exit permission processing of the first embodiment, a processing similar to the entry permission processing of FIG. 9 from step S902 to step S906 may be executed.

Authorization Processing When Exiting the First Gate

The authorization processing executed by the information processing apparatus 105 according to the present embodiment upon exit at the first gate 101A is executed as in the flowchart illustrated in FIG. 8 according to the first embodiment. However, the processing details are different from the processing details of the exit processing of step S810. The step S810 which is different from step S810 in the first embodiment will now be described.

Figure 11:
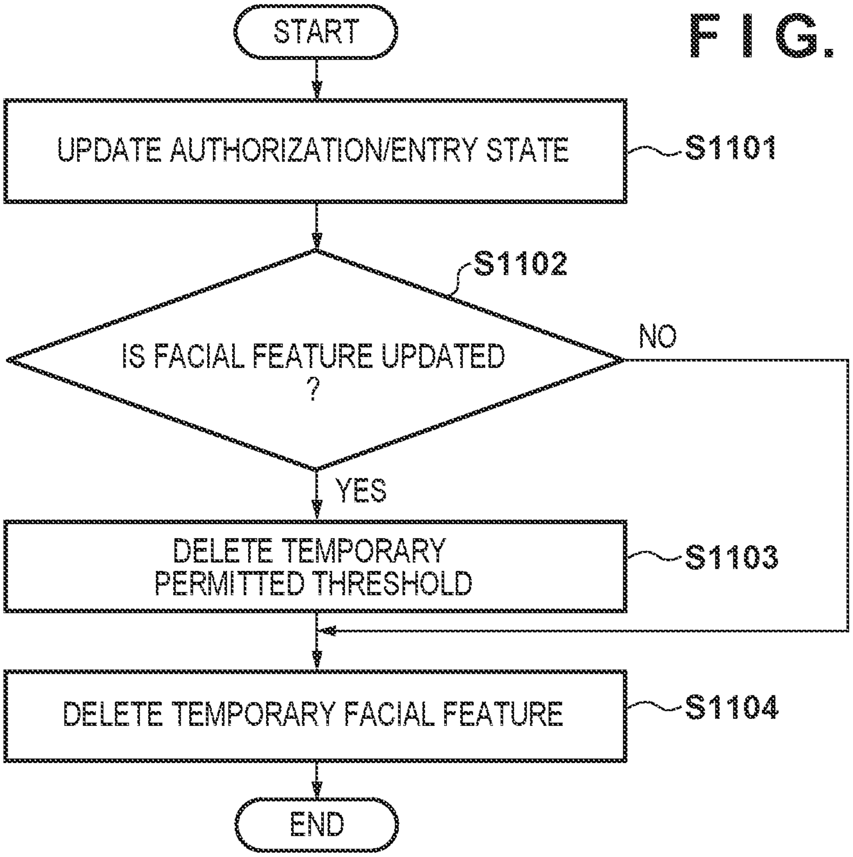
FIG. 11 is a flowchart illustrating an example of exit processing.

FIG. 11 is a flowchart illustrating an example of the details of the exit processing executed by the state management unit 306 in step S810 according to the second embodiment.

First, in step S1101, the state management unit 306 changes the authorization state in the database managing the person to "unauthorized" and the entry state to "has not entered". This processing is similar to the processing in step S810 of the first embodiment. In step S1102, the state management unit 306 checks whether or not a facial feature update has been performed. In a case where it has been updated, the processing proceeds to step S1103. Otherwise, the processing proceeds to step S1104.

In step S1103, the state management unit 306 deletes the temporary permitted threshold from the database, and the processing proceeds to step S1104. In step S1104, the state management unit 306 deletes the temporary facial feature from the database, and the exit processing ends. Note that in the present embodiment, whether the facial feature has been updated is checked in step S1102, However, the temporary permitted threshold may be deleted each time.

According to such processing, the facial feature of a person extracted from an image upon entry is registered as a comparison target and used in comparison. Also, the permitted threshold may be changed via the similarity of a comparison upon entry. In this manner, the false rejection rate, where comparison fails even when it is the person in question, can be reduced.

Third Embodiment

In the first and second embodiment, at a first-stage authorization gate, 1:N authentication is performed to compare against a plurality of people registered in advance. The information processing apparatus 105 according to the present embodiment reads a medium, such as an employee ID card, held by the person entering and performs 1:1 authentication to compare a feature of the person registered in the medium and a feature of the person entering. In other words, a feature of a person seen in the camera and a facial feature associated with a storage medium storing ID information (identification information) owned by the person are compared. In the configuration according to the present embodiment, costs relating to presenting and reading ID information become necessary, but the accuracy of comparison is high due to a reduction in failures in which the wrong person is accepted. Also, compared to performing 1:N authentication, the processing time requiring for comparing is less due to only comparing whether or not the person is a specific person.

The storage medium according to the present embodiment may be a magnetic card, an ID card or smart device with a built-in IC chip, a card inscribed with a barcode or a QR code (registered trademark), or a smart device that can display such a code.

Figure 12:
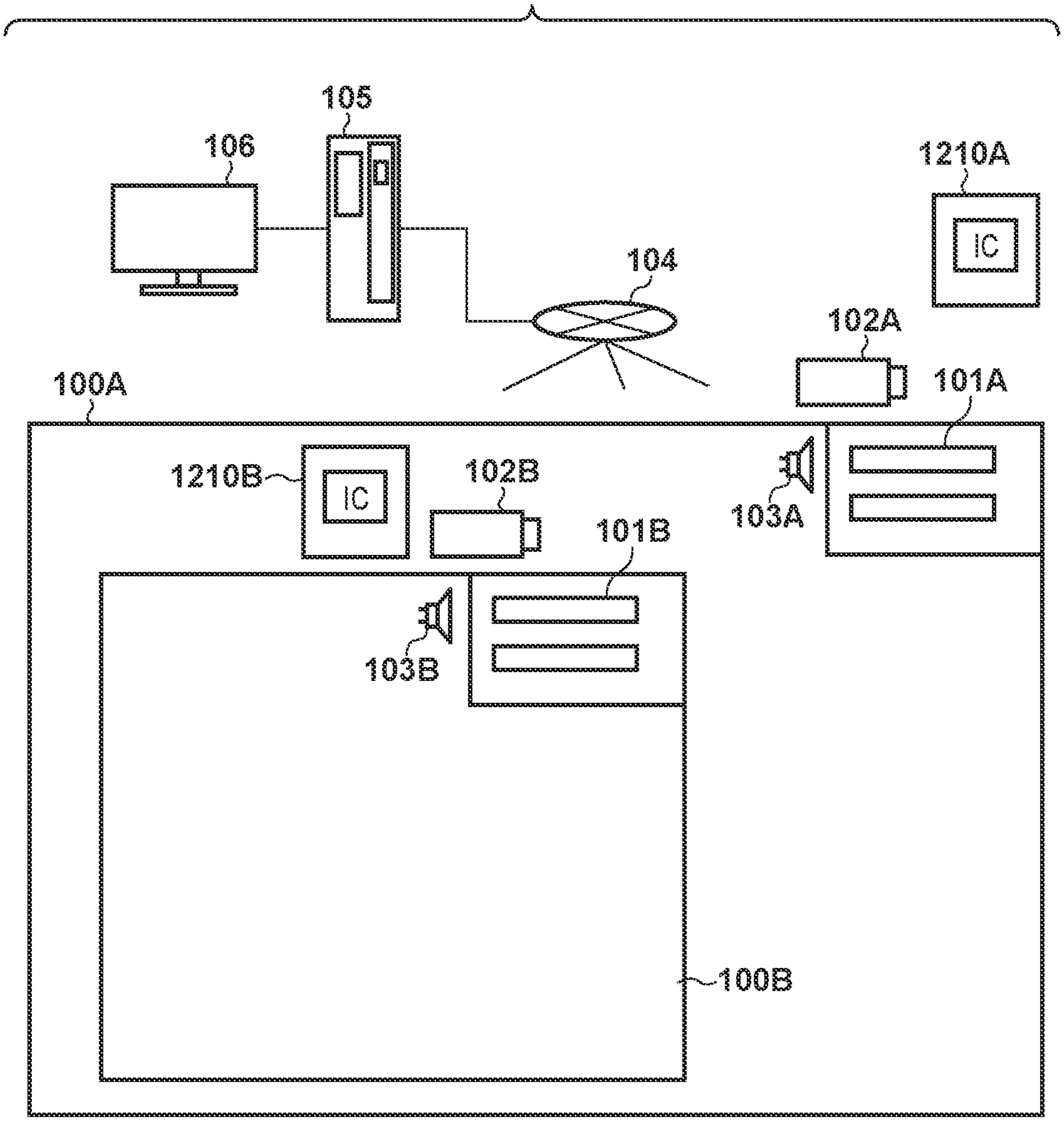
FIG. 12 is a diagram illustrating an example of the overall configuration of an information processing system.

The information processing apparatus 105 according to the present embodiment reads the ID information from the storage medium via a contact or non-contact method using the reading apparatus illustrated in FIG. 12.

FIG. 12 is a diagram illustrating an example of the overall configuration and arrangement of apparatuses used when authorization is performed using the information processing system according to the present embodiment. In the information processing system according to the present embodiment, the configurations except for the ID reading apparatus 1210A and the ID reading apparatus 1210B are similar to the configurations in FIG. 1, and thus redundant descriptions will be omitted. The reading apparatuses 1210A and 1210B are arranged at the first gate 101A and the second gate 101B, respectively, and can read the storage mediums owned by people.

Figure 13:
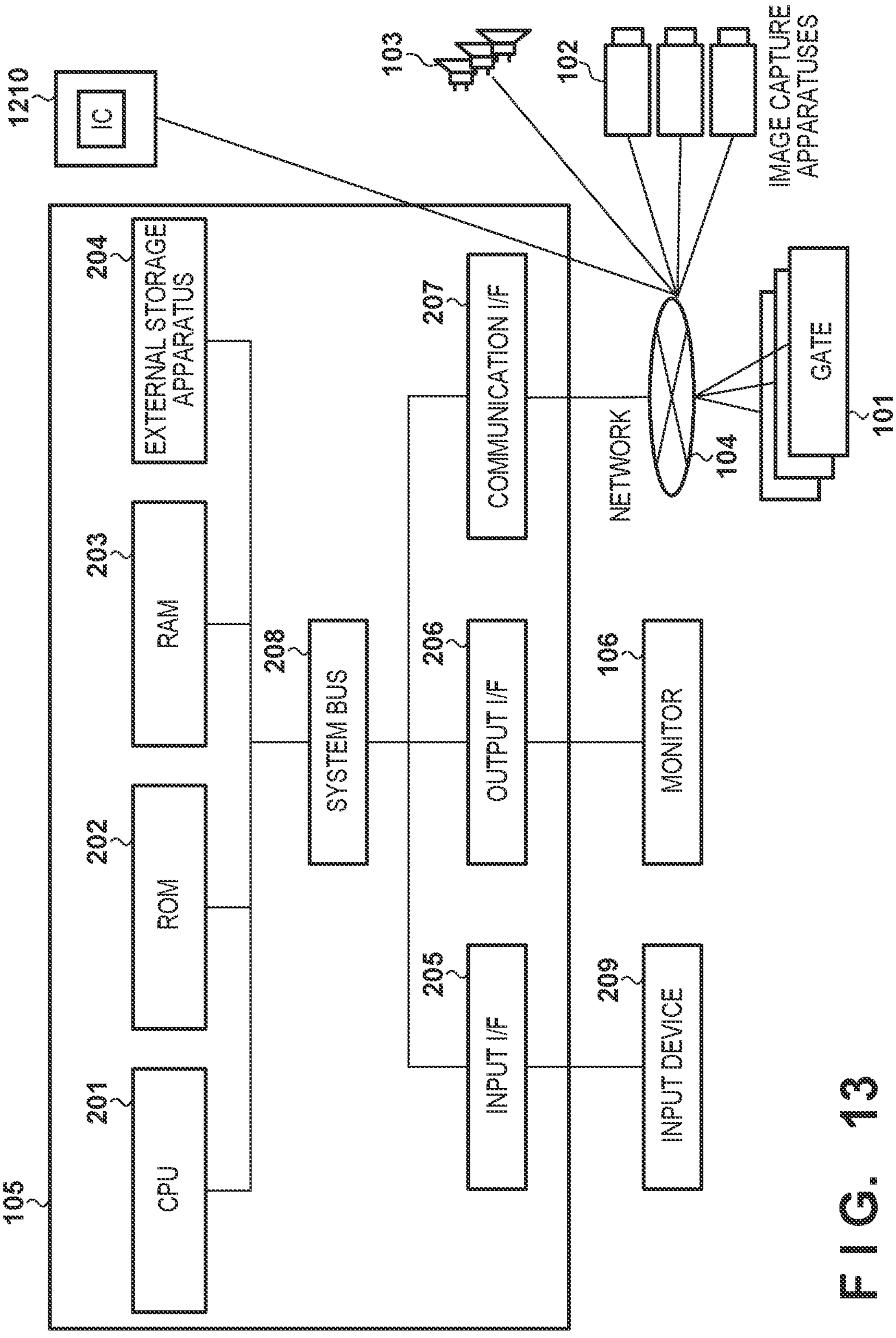
FIG. 13 is a diagram illustrating an example of the hardware configuration of the information processing system.

FIG. 13 is a block diagram illustrating an example of the hardware configuration of the information processing system including the information processing apparatus 105 according to the present embodiment. The information processing system according to the present embodiment has a similar configuration to the configuration illustrated in FIG. 2 except for including the reading apparatuses 1210, and thus redundant descriptions will be omitted.

Figure 14:
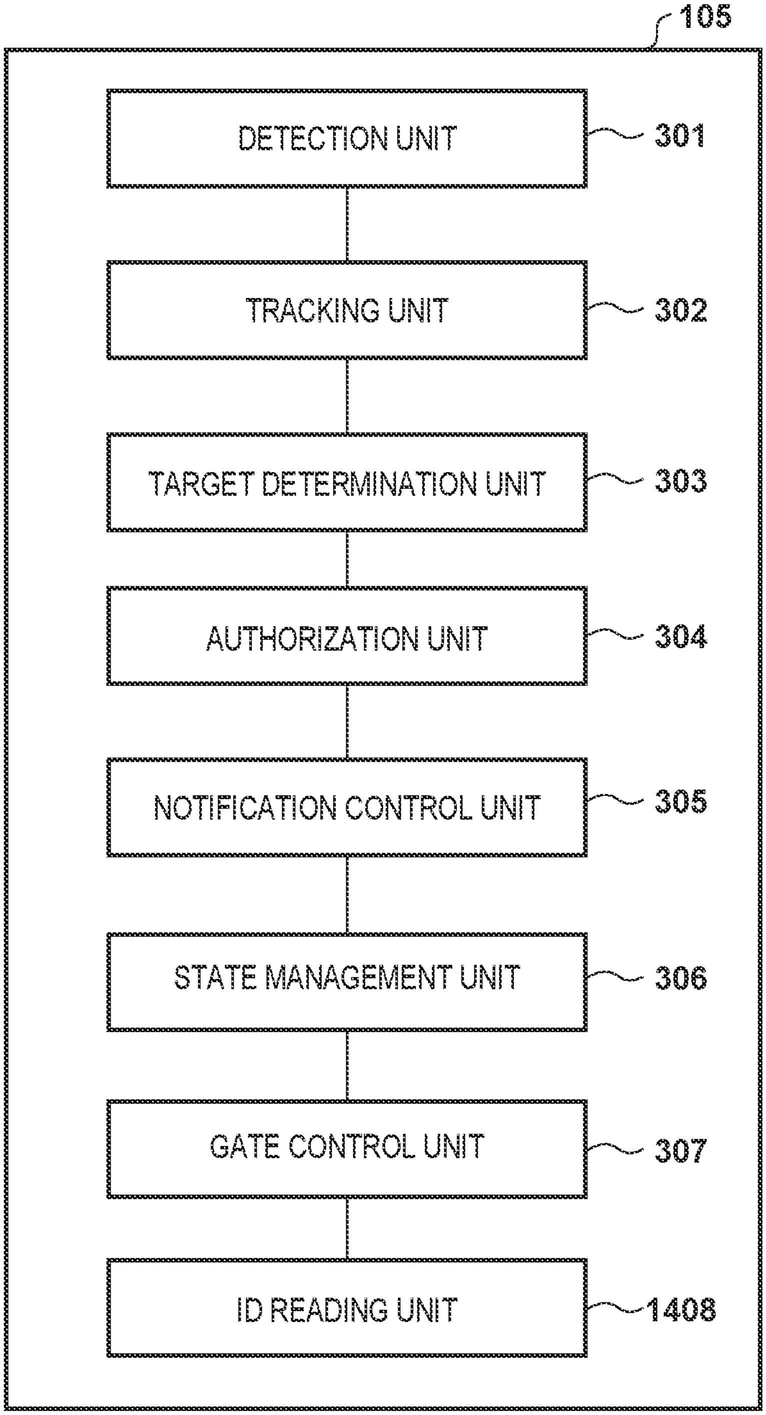
FIG. 14 is a block diagram illustrating an example of the functional configuration of the information processing apparatus.

FIG. 14 is a block diagram illustrating an example of the functional configuration of the information processing apparatus 105 according to the present embodiment. The information processing apparatus 105 according to the present embodiment has a similar configuration to the configuration illustrated in FIG. 3 except for including an ID reading unit 1408, and thus redundant descriptions will be omitted.

Authorization Processing When Entering the First Gate

Figure 15A:
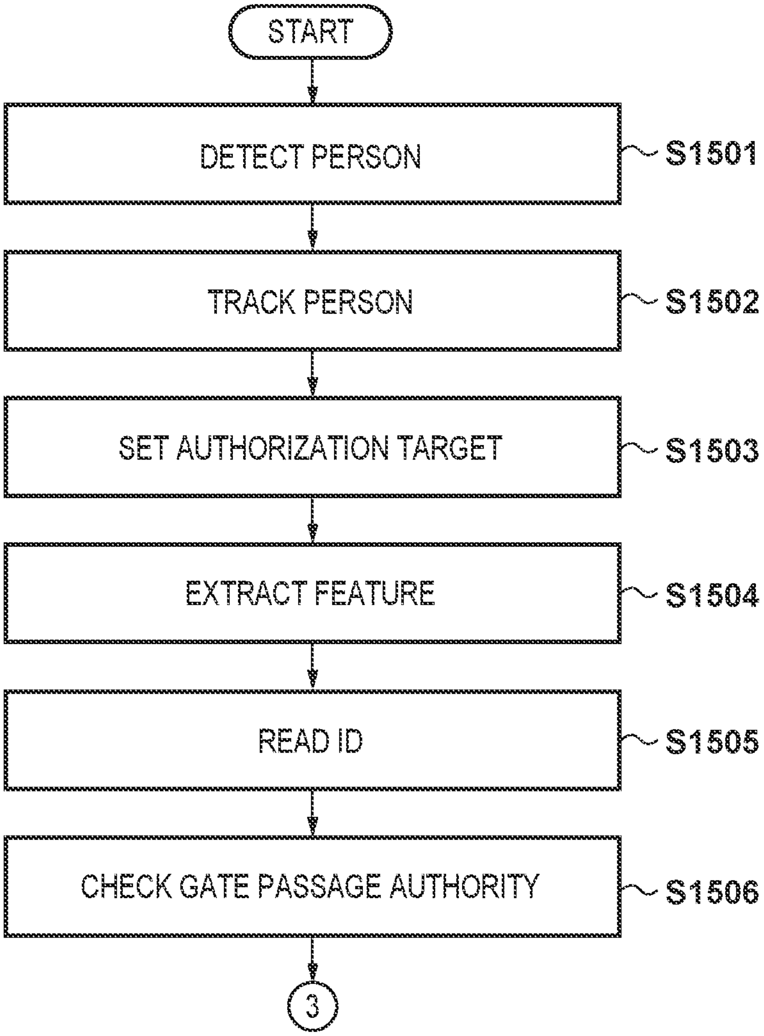
FIGS. 15A and 15B are flowcharts illustrating an example of authorization processing at the first gate.
Figure 15B:
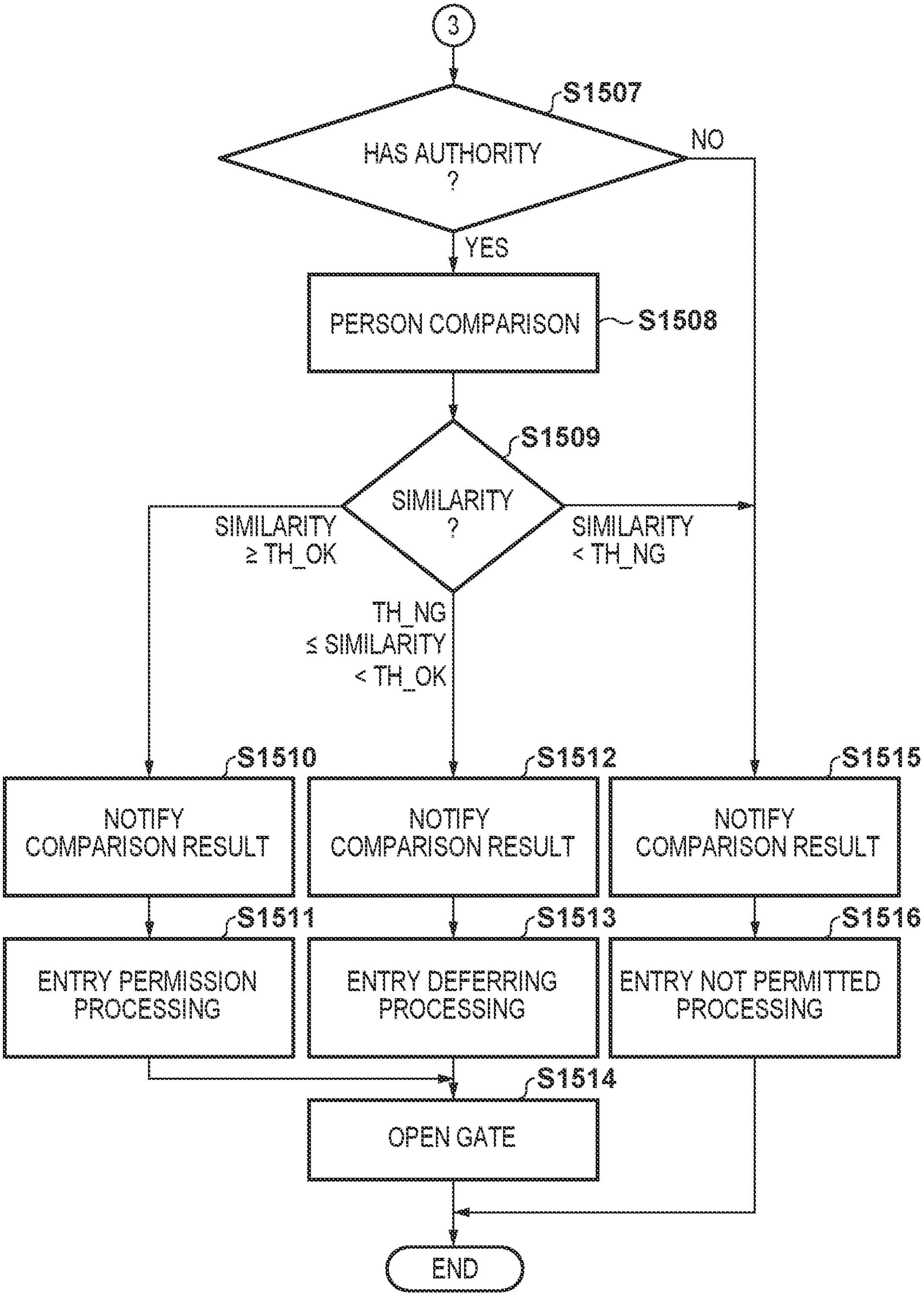

FIGS. 15A and 15B are flowcharts illustrating an example of the authorization processing executed by the information processing apparatus 105 according to the present embodiment upon entry at the first gate 101A. Steps S1501 to S1504 are similar to steps S501 to S504 in FIGS. 5A and 5B. In step S1505, the ID reading unit 1408 reads the storage medium owned by the person entering via the reading apparatus 1210A. In step S1506, the authorization unit 304 references the database and checks whether or not the person corresponding to the ID information read from the storage medium is registered as a person permitted to pass through the first gate 101A. In a case where the person is registered as a person permitted to pass through, the processing proceeds to step S1508. Otherwise, the processing proceeds to step S1515.

In step S1508, the authorization unit 304 compares the facial feature of the person corresponding to the ID information and the facial feature extracted in step S1504 and obtains the registered face with the highest similarity. In this example, the facial feature of the person corresponding to the ID information is a facial feature registered in the database in advance that is obtained from the database. However, no such limitation is intended. For example, a read facial feature stored in the storage medium may be used as the facial feature of the person corresponding to the ID information.

In step S1509, the authorization unit 304 determines whether the highest similarity (the first similarity) corresponding to the face output in step S1508 is less than the first threshold (the not permitted threshold TH_NG), is equal to or greater than the second threshold (the permitted threshold TH_OK), or in between the two thresholds. When the similarity is equal to or greater than the permitted threshold, the processing proceeds to step S1510, when the similarity is less than the permitted threshold but equal to or greater than the not permitted threshold, the processing proceeds to step S1512, and when the similarity is less than the not permitted threshold, the processing proceeds to step S1515. The processing from steps S1510 to S1516 is similar to the processing from steps S510 to S516 in FIGS. 5A and B.

Authorization Processing When Entering the Second Gate

Figure 16A:
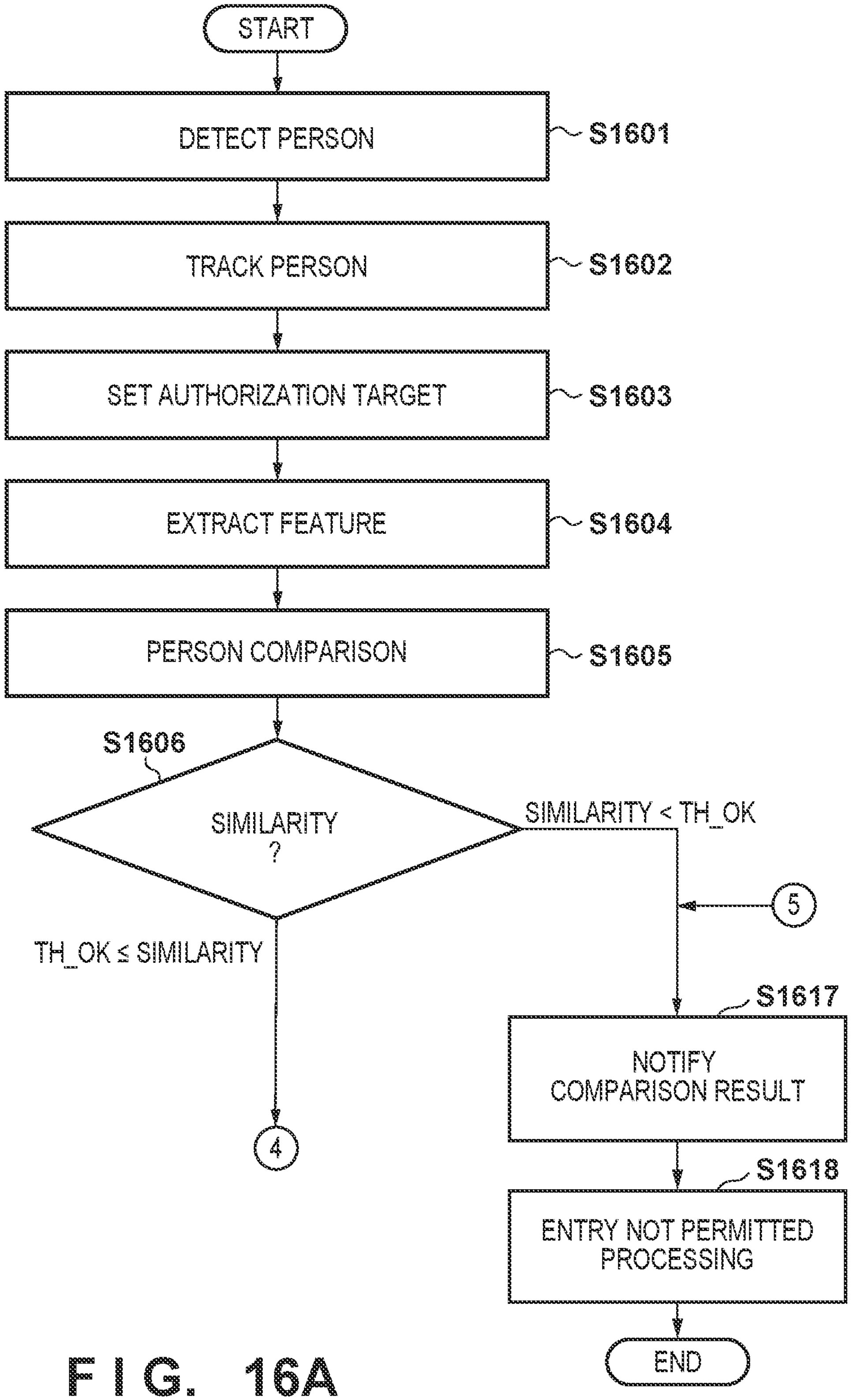
FIGS. 16A and 16B are flowcharts illustrating an example of authorization processing at the second gate.
Figure 16B:
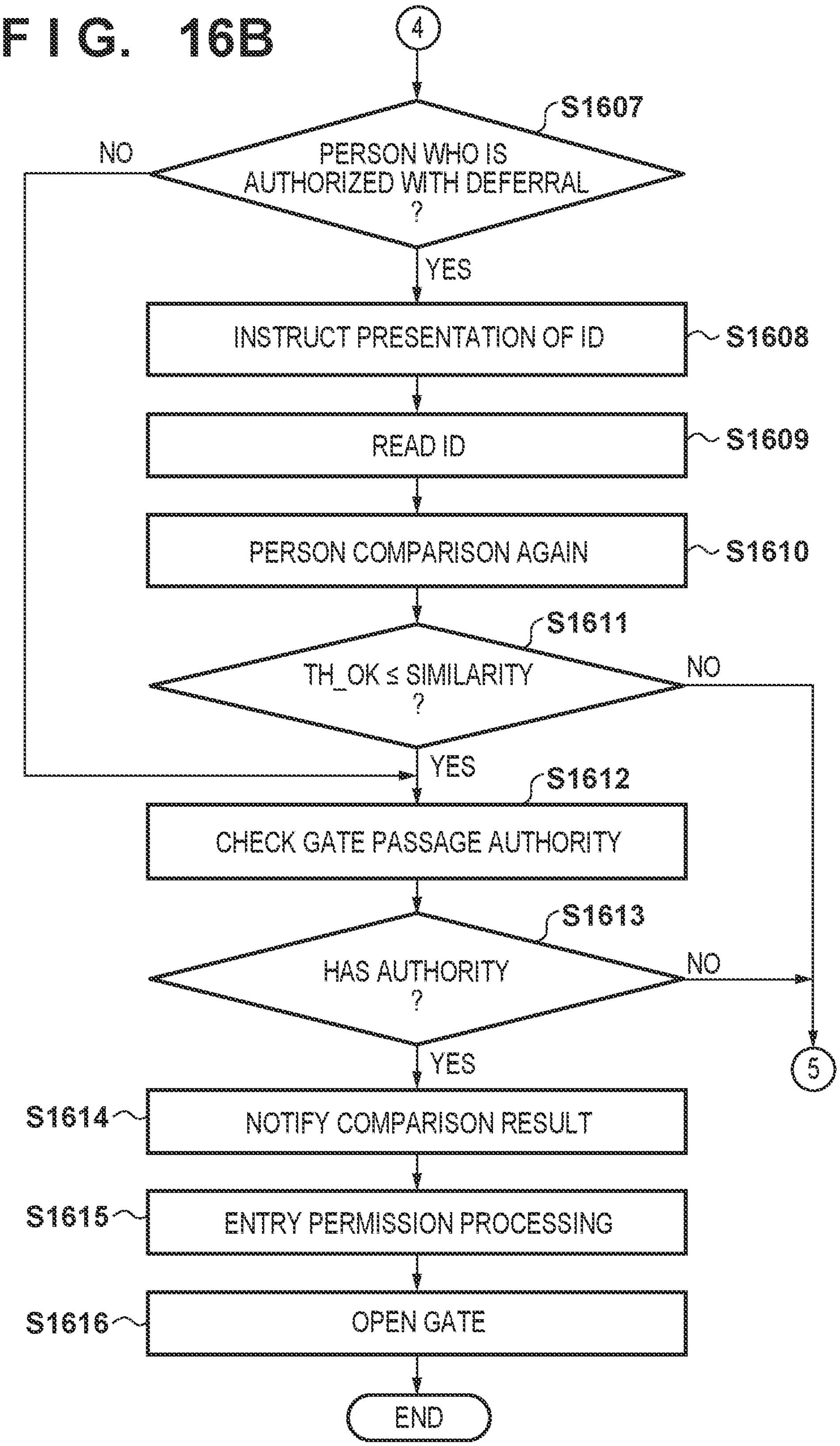

The information processing apparatus 105 according to the present embodiment ensures a similar level of security at the second gate as at the first gate by the reading apparatus 1210B reading the ID information of a person with "authorized and deferred" as the authorization state. FIGS. 16A and 16B are flowcharts illustrating an example of the authorization processing executed by the information processing apparatus 105 according to the present embodiment upon entry at the second gate 101B.

The processing from steps S1601 to S1605 is similar to the processing from steps S601 to S605 in FIG. 6. In step S1606, the authorization unit 304 determines whether or not the highest similarity corresponding to the face output in step S1605 is greater than the second threshold (permitted threshold TH_OK). In a case where the similarity is equal to or greater than the permitted threshold, the processing proceeds to step S1607. In a case where the similarity is less than the permitted threshold, the processing proceeds to step S1617.

In step S1607, the authorization unit 304 checks whether the authorization state of the person whose face is output in step S1605 is "authorized and deferred". In a case where the authorization state is "authorized and deferred", the processing proceeds to step S1608. Otherwise, the processing proceeds to step S1612.

In step S1608, the notification control unit 305 notifies the person via audio or a display on a monitor, prompting them to present the storage medium storing the ID information owned by the person to the reading apparatus 1210B. In step S1609, the ID reading unit 1408 reads the ID information from the storage medium presented by the person via the reading apparatus 1210B.

In step S1610, the authorization unit 304 compares the facial feature of the person corresponding to the ID information and the facial feature extracted in step S1604 and obtains the registered face with the highest similarity. In step S1611, the authorization unit 304 determines whether or not the similarity determined to be the highest in step S1610 is greater than the second threshold (permitted threshold TH_OK). When the similarity is equal to or greater than the permitted threshold, the processing proceeds to step S1612. In a case where the similarity is less than the permitted threshold, the processing proceeds to step S1617.

In step S1612, the authorization unit 304 checks whether or not the person whose registered face is obtained in step S1610 has the authority to pass through the second gate 101B. In a case where the person has passage authority, the processing proceeds to step S1614. In a case where the person does not have passage authority, the processing proceeds to step S1617. The processing from steps S1614 to S1618 is similar to the processing from steps S609 to S613 in FIG. 6. The processing upon exit of each gate is similar to the processing in the first embodiment.

In this manner, in an entry and exit management system installed with multi-stage authorization gates, the information processing apparatus 105 can perform a comparison of a facial feature associated with the storage medium storing ID information owned by a person at a first-stage authorization gate. Also, at a second-stage authorization gate, the information processing apparatus 105 can only perform a comparison of the facial feature associated with the storage medium again for a person determined as "deferred" at the first-stage authorization gate and compare the facial feature for a person determined as "permitted" at the first-stage authorization gate. According to such processing, congestion can be prevented while maintaining a certain level of security accuracy at the first-stage authorization gate, and the normal level of security accuracy can be ensured in the second-stage authorization gate. Note that in a derived embodiment for increasing the security, at the second-stage authorization gate, at all times, a comparison of the facial feature associated with the storage medium storing the ID information may be performed.

Fourth Embodiment

In the third embodiment, an ID reading apparatus is installed at the second-stage authorization gate. To improve the user-friendliness, in the present embodiment, second-stage authorization gates (for entering the building) are installed at a plurality of locations.

Here, one or more of the authorization gates may be configured without an ID reading apparatus to reduce installation costs.

Figure 17:
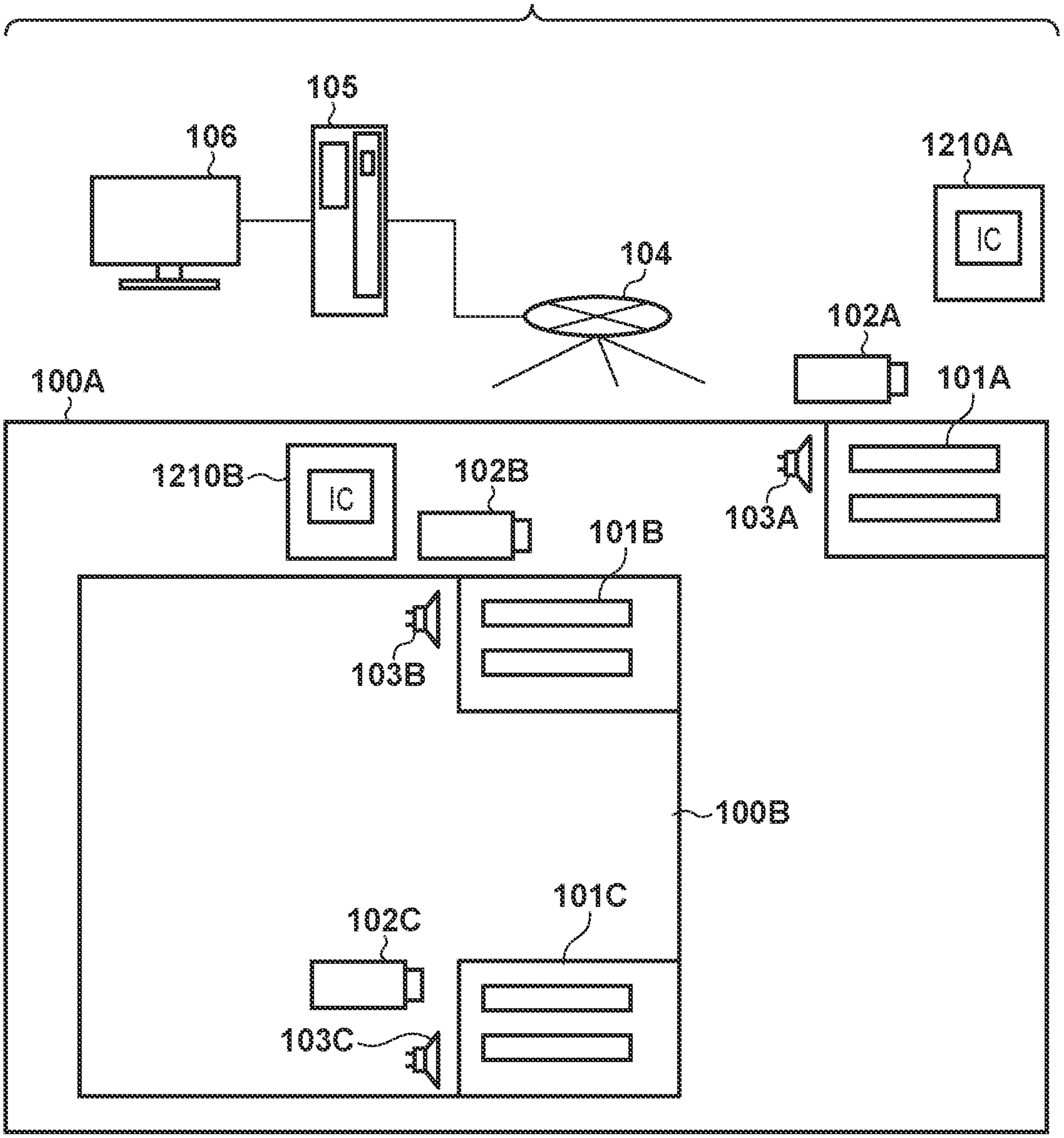
FIG. 17 is a diagram illustrating an example of the overall configuration of an information processing system.

FIG. 17 is a diagram illustrating an example of the overall configuration of an information processing system according to the present embodiment. Configurations which as the same as the configurations in FIG. 12 are given the same reference number, and redundant descriptions will be omitted. In the building 100B, the second gate 101B and the second gate B(101C) are installed. Also, an image capture apparatus 102C, a speaker, and a notification apparatus 103C are installed at the second gate B(101C). In this example, the ID reading apparatus 1210B is installed at the second gate 101B, but a reading apparatus is not installed at the second gate B(101C).

Authorization Processing When Entering the Second Gate B

Figure 18:
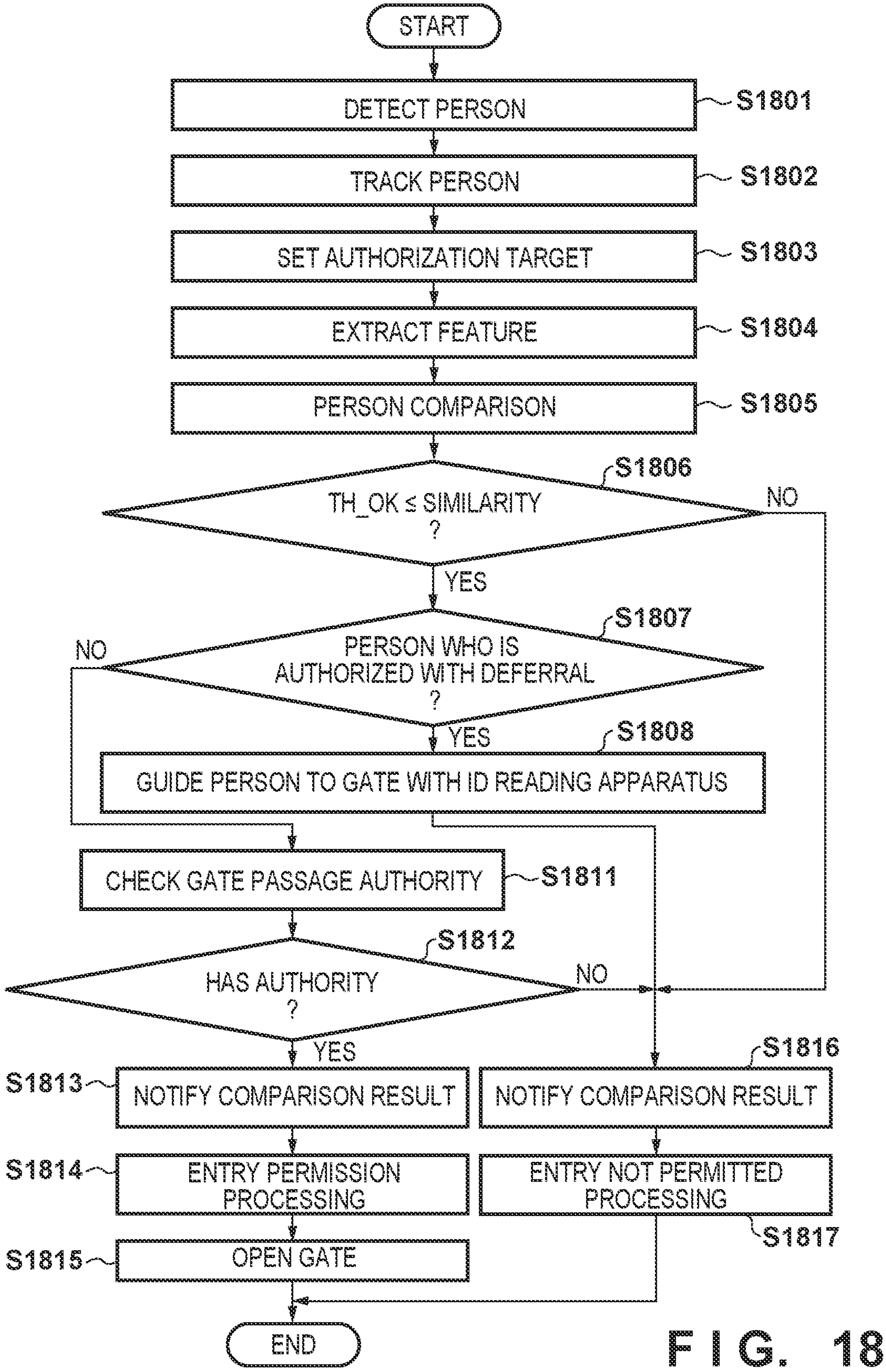
FIG. 18 is a flowchart illustrating an example of authorization processing at the second gate.

FIG. 18 is a flowchart illustrating an example of the authorization processing executed by the information processing apparatus 105 according to the present embodiment upon entry at the second gate B(101C). In the present embodiment, a person with "authorized and deferred" as the authorization state is guided to the second gate 101B where ID information can be read and not the second gate B(101C) where ID information cannot be read.

The processing from steps S1801 to S1807 is similar to the processing from steps S1601 to S1607 in FIGS. 16A and 16B. In step S1808, the notification control unit 305 guides the person entering to the second gate 101B where ID information can be read, and the processing proceeds to step S1816. Guiding the person entering may be performed via the notification apparatus 103 or via a notification sent to the portable terminal owned by the person entering. The processing from steps S1811 to S1817 is similar to the processing from steps S1612 to S1618 in FIGS. 16A and 16B.

Note that to prompt action to head directly to the second gate 101B and not the second gate B(101C) where no reading apparatus is installed, the information processing apparatus 105 can notify the person entering that their result when entering the first gate 101A is "deferred". Also, a place other than a gate where an ID reading apparatus can be installed, and people with the authorization state of "authorized and deferred" can be prompted to be authorized at this place to obtain the authorized state.

According to such a configuration, authorization processing can be executed without installing an ID reading apparatus at all of the authorization gates. Thus, the installation cost can be reduced while maintaining security accuracy.

Fifth Embodiment

Figure 19:
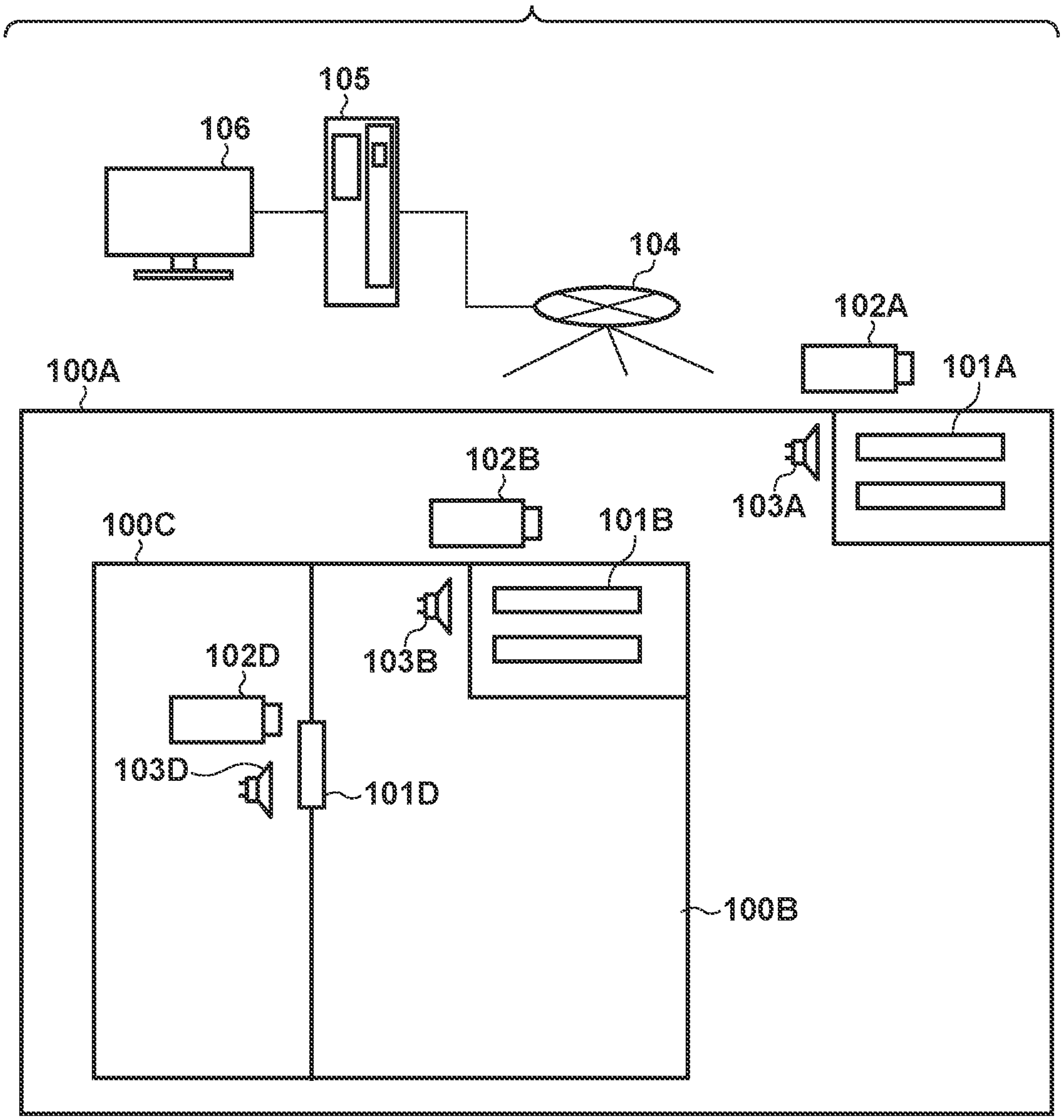
FIG. 19 is a diagram illustrating an example of the overall configuration of an information processing system.

In the first to fourth embodiments, two-stage authorization gates are prepared and processing is executed. However, the number of authorization gates is not particularly limited to two. In the present embodiment, three-stage or more authorization gates are used to perform a comparison of a person entering. FIG. 19 is a diagram illustrating an example of the overall configuration of the information processing system including a third place (third gate) 101D reached after passing through the second gate 101B. At the third gate 101D, an image capture apparatus 102D and a notification apparatus 103D are installed in a similar manner as at the other gates, and authorization processing is executed for a person entering imaged by the image capture apparatus 102D.

As described above, the information processing apparatus 105 according to the present embodiment checks whether the person entering imaged by the image capture apparatus 102D at the third gate 101D is a person registered as a person permitted to pass through the third gate 101D and categorizes the authorization results. In a case where three-stage authorization gates are used as illustrated in FIG. 19, the information processing apparatus 105 can categorize the authorization results into "permitted", "deferred", and "not permitted" for the first-stage authorization gate and "permitted" and "not permitted" for the second-stage and third-stage authorization gates.

The information processing apparatus 105 according to the present embodiment calculates the similarity (a third similarity) between the feature of a person imaged by the image capture apparatus 102D and the feature of a register person and determines whether or not the calculated similarity is less than a fourth threshold. Next, in a case where the third similarity is less than the fourth threshold, the information processing apparatus 105 performs control to not permit passage at the third gate 101D. In this example, the fourth threshold is the same value as the second threshold, but the value may be set as desired by the user depending on desired conditions. For example, the value may be set to a value greater than the second threshold.

In a similar manner in a different embodiment, the third gate 101D may be installed between the first gate 101A and the second gate 101B (in other words, installed as a second-stage gate) (in this case, the second gate 101B is referred to as a third-stage gate). In this case, the information processing apparatus 105 may categorize the authorization results into "permitted", "deferred", and "not permitted" for the first-stage and second-stage authorization gate and "permitted" and "not permitted" for the third-stage authorization gate.

In this manner, the information processing apparatus 105 can determine whether the calculated third similarity is less than a fifth threshold less than the fourth threshold, equal to or greater than the fifth threshold but less than the fourth threshold, or is equal to or greater than the fourth threshold. In this case, the information processing apparatus 105 classifies the authorization result as permitted, deferred, or not permitted on the basis of whether the third similarity is equal to or greater than the fourth threshold, less than the fourth threshold but equal to or greater than the fifth threshold, or less than the fifth threshold. In this example, the fifth threshold is the same value as the first threshold, but the value may be set as desired by the user depending on desired conditions. For example, the value may be set to a value greater than the first threshold. Such a configuration is particularly suitable in a case where the place between the second-stage authorization gate and the third-stage authorization gate is a place with a relatively low security clearance such as a cafeteria and many people need to passing through the second-stage authorization gate.

Note that in the example in FIG. 19, an ID reading apparatus is not installed. However, as in the third embodiment or the fourth embodiment, a reading apparatus may be installed at each gate. Also, in the example described, gates up to a third-stage are installed, but a fourth-stage gate or more may be installed in a similar manner.

Sixth Embodiment

In the first to fifth embodiment, authorization processing is executed by giving permission to pass through to a person registered in a database in advance. However, it is plausible that there may be some cases in which a visitor or the like that is not registered in the database in advance is given permission to pass through. However, normally, when a visitor not registered in the database in advance tries to enter from the first-stage gate, entrance is not permitted due to the similarity of the comparison result being less than the permitted threshold.

From this perspective, the information processing apparatus 105 according to the present embodiment notifies the person entering when the first similarity is less than the first threshold (when the authorization result is "not permitted"). Here, for example, the information processing apparatus 105 may notify the person entering with an instruction guiding them to a reception where a non-illustrated image capture apparatus is installed to register a temporary facial feature by a face image of the visitor being captured, for example. This guidance instruction may be normally displayed near the gate for visitors. In a case where this notification is issued, an image is captured of the visitor at the reception, and a facial feature in the captured image is registered in the database as a temporary facial feature, the visitor can be given "permitted" as the authorization state by executing authorization processing similar to the authorization processing in the first embodiment using a temporary facial feature. Also, in a case where a facial feature in a face image of the visitor is registered as a temporary facial feature at the reception, at this point in time, the authorization state for the first gate may be set to "permitted" and the person may be permitted to pass through the first gate.

Application Example

In the embodiments described above, three categories of "permitted", "deferred", and "not permitted" are used at the first-stage authorization gate. However, "permitted" and "deferred" may be further categorized into multiple levels. For example, the deferred category may be further split into two level using an additional threshold, with different predetermined control being performed. For example, with one, 1:1 authentication using a reading apparatus at the second gate may be executed, and with the other, a threshold may be changed. Also, the information processing apparatus 105 may store a value for the similarity calculated at the first gate and execute authorization processing using a threshold set per gate (depending on the security clearance) on the basis of the similarity stored without imaging the person entering there and then when they pass through the gate.

Also, in the second embodiment, in a case where the permitted threshold is exceeded by a significant margin, a notification may be issued prompting the person to update the facial feature. However, the condition for issuing such a notification is not particularly limited thereto, and a notification prompting the person to update the facial feature may be issued depending on the authorization processing history, for example. For example, in a case where the authorization state for a person is determined as "deferred" at an increasing frequency (for example, equal to or greater than a predetermined ratio) over a predetermined period (or a predetermined number of authorizations), the notification control unit 305 may issue a notification prompting the person to update the facial feature.

According to the information processing system and the information processing method of the embodiments described above, in a case where multi-stage authorization places (for example, authorization gates) are provided, the security accuracy can be ensured while preventing congestion. Specifically, congestion can be prevented while maintaining a certain level of security accuracy in the first-stage authorization, and the normal level of security accuracy can be ensured in the second-stage authorization.

The present invention is not limited to the above embodiments and various changes and modifications can be made within the spirit and scope of the present invention. Therefore, to apprise the public of the scope of the present invention, the following claims are made.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-008949, filed Jan. 24, 2023, which is hereby incorporated by reference herein in its entirety.

What is claimed is:

1. An information processing system comprising:

at least one memory storing instructions; and at least one processor that, upon execution of the instructions, is configured to:

compare a feature of a person detected in a first image and a feature of a person registered as a person permitted to pass through a first place, perform control to permit passage through the first place in a case where a first similarity between the feature of the person detected in the first image and the feature of the person registered as the person permitted to pass through the first place is equal to or greater than a first threshold, compare a feature of a person detected in a second image and a feature of a person registered as a person permitted to pass through a second place reached after passing through the first place, perform control to not permit the person to pass through the second place in a case where a second similarity between the feature of the person detected in the second image and the feature of the person registered as the person permitted to pass through the second place is less than a second threshold greater than the first threshold, and categorize an authorization result of comparison of the feature of the person detected in a second image and the feature of the person registered as the person permitted to pass through a second place reached after passing through the first place into: permitted to pass through in a case where the first similarity is equal to or greater than the second threshold, deferring a determination in a case where the first similarity is less than the second threshold and equal to or greater than the first threshold, and not permitted to pass through in a case where the first similarity is less than the first threshold.

2. The information processing system according to claim 1, wherein in a case where the authorization result is categorized as the deferring a determination, the at least one processor, upon execution of the instructions, is configured to use a feature of a person corresponding to identification information of a person registered in a storage medium owned by a person being compared as the feature of the person registered as the person permitted to pass through the second place.

3. The information processing system according to claim 1, wherein the at least one processor, upon execution of the instructions, is further configured to notify a person targeted for comparison in a case where the authorization result is categorized as the deferring a determination.

4. The information processing system according to claim 1, wherein the at least one processor, upon execution of the instructions, is further configured to notify a person targeted for comparison in a case where the authorization result is categorized as the deferring a determination and the second similarity is less than the second threshold.

5. The information processing system according to claim 1, wherein the at least one processor, upon execution of the instructions, is configured to use a feature of a person corresponding to identification information of a person registered in a storage medium owned by a person targeted for the comparison as the feature of the person registered as the person permitted to pass through the first place.

6. The information processing system according to claim 1, wherein the at least one processor, upon execution of the instructions, is configured to use a feature of a pre-registered plurality of people as the feature of the person registered as the person permitted to pass through the first place.

7. The information processing system according to claim 1, wherein the at least one processor, upon execution of the instructions, is configured to use a feature of a person corresponding to identification information of a person registered in a storage medium owned by a person being compared as the feature of the person registered as the person permitted to pass through the second place.

8. The information processing system according to claim 1, wherein the at least one processor, upon execution of the instructions, is configured to use a feature of a pre-registered plurality of people as the feature of the person registered as the person permitted to pass through the second place.

9. The information processing system according to claim 8, wherein the at least one processor, upon execution of the instructions, is configured to use a feature of, from among the pre-registered plurality of people, a person that is compared with the first similarity being equal to or greater than a first threshold as the feature of the person registered as the person permitted to pass through the second place.

10. The information processing system according to claim 8, wherein the at least one processor, upon execution of the instructions, is further configured to:

hold a feature of a person determined to have the first similarity of equal to or greater than the first threshold, and use, in addition to a feature of the pre-registered plurality of people, a feature of a person held as the feature of the person registered as the person permitted to pass through the second place.

11. The information processing system according to claim 10, wherein the at least one processor, upon execution of the instructions, is configured to compare one or more features detected for a person in a plurality of first images with a feature of a registered person as the person permitted to pass through the first place, on a basis of features of a person detected in a plurality of first images, and hold one or more of the features detected in the plurality of first images, for the person determined to have the first similarity of equal to or greater than the first threshold.

12. The information processing system according to claim 11, wherein for the person determined to have the first similarity of equal to or greater than the first threshold, the at least one processor, upon execution of the instructions, is configured to hold a feature detected in one of the plurality of first images with the first similarity of less than a third threshold greater than the second threshold.

13. The information processing system according to claim 11, wherein the at least one processor, upon execution of the instructions, is further configured to:

determine whether or not the features detected in the plurality of first images are suitable for use as the feature of the person registered as the person permitted to pass through the second place; and hold a feature not determined as being unsuitable for use from among the features detected in the plurality of first images.

14. The information processing system according to claim 13, wherein the at least one processor, upon execution of the instructions, is configured to determine a feature detected in a first image in which the person is in a predetermined state where the face of the person is not fully visible as being unsuitable for use as the feature of the person registered as the person permitted to pass through the second place.

15. The information processing system according to claim 10, wherein the at least one processor, upon execution of the instructions, is configured to delete a feature held for a certain person in a case where, for the certain person, the second similarity is determined to be equal to or greater than the second threshold.

16. The information processing system according to claim 1, wherein in a case where the first similarity is less than a fourth threshold greater than the second threshold and the second similarity is less than a fifth threshold less than the second threshold, the at least one processor, upon execution of the instructions, is configured to perform control to not permit the person to pass through the second place.

17. The information processing system according to claim 1, wherein the at least one processor, upon execution of the instructions, is further configured to:

compare a feature of a person detected in a third image and a feature of a person registered as a person permitted to pass through a third place reached after passing through the second place, and perform control to not permit the person to pass through the third place in a case where a third similarity between the feature of the person detected in the third image and the feature of the person registered as the person permitted to pass through the third place is less than a sixth threshold.

18. An information processing method comprising:

comparing a feature of a person detected in a first image and a feature of a person registered as a person permitted to pass through a first place;

performing control to permit passage through the first place in a case where a first similarity between the feature of the person detected in the first image and the feature of the person registered as the person permitted to pass through the first place is equal to or greater than a first threshold;

comparing a feature of a person detected in a second image and a feature of a person registered as a person permitted to pass through a second place reached after passing through the first place;

performing control to not permit the person to pass through the second place in a case where a second similarity between the feature of the person detected in the second image and the feature of the person registered as the person permitted to pass through the second place is less than a second threshold greater than the first threshold; and categorizing an authorization result of comparison of the feature of the person detected in a second image and the feature of the person registered as the person permitted to pass through a second place reached after passing through the first place into: permitted to pass through in a case where the first similarity is equal to or greater than the second threshold, deferring a determination in a case where the first similarity is less than the second threshold and equal to or greater than the first threshold, and not permitted to pass through in a case where the first similarity is less than the first threshold.

19. A non-transitory computer-readable storage medium that stores a program for causing a computer to:

compare a feature of a person detected in a first image and a feature of a person registered as a person permitted to pass through a first place;

perform control to permit passage through the first place in a case where a first similarity between the feature of the person detected in the first image and the feature of the person registered as the person permitted to pass through the first place is equal to or greater than a first threshold;

compare a feature of a person detected in a second image and a feature of a person registered as a person permitted to pass through a second place reached after passing through the first place;

perform control to not permit the person to pass through the second place in a case where a second similarity between the feature of the person detected in the second image and the feature of the person registered as the person permitted to pass through the second place is less than a second threshold greater than the first threshold; and categorize an authorization result of comparison of the feature of the person detected in a second image and the feature of the person registered as the person permitted to pass through a second place reached after passing through the first place into: permitted to pass through in a case where the first similarity is equal to or greater than the second threshold, deferring a determination in a case where the first similarity is less than the second threshold and equal to or greater than the first threshold, and not permitted to pass through in a case where the first similarity is less than the first threshold.

* * * * *